March 28, 1961

J. R. FLANAGAN ET AL 2,976,659

ARTICLE PACKING APPARATUS

Filed Sept. 17, 1958

INVENTORS
James R. Flanagan and
Penrose R. Hoopes

BY Mason, Fenwick & Lawrence

ATTORNEYS

March 28, 1961 J. R. FLANAGAN ET AL 2,976,659
ARTICLE PACKING APPARATUS
Filed Sept. 17, 1958 19 Sheets-Sheet 2
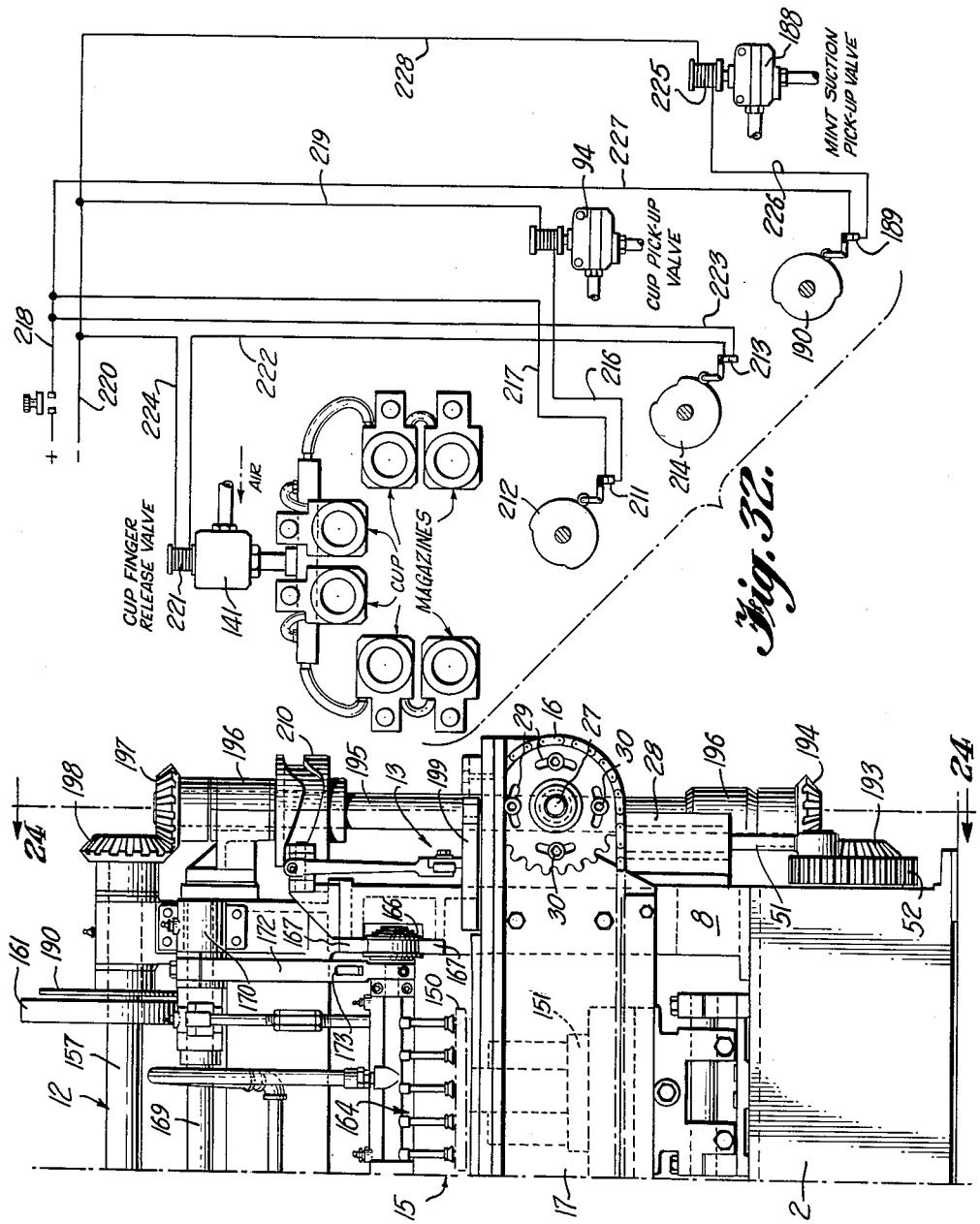
INVENTORS
James R. Flanagan 3rd
Penrose R. Hoopes
BY Mason, Fenwick & Lawrence
ATTORNEYS

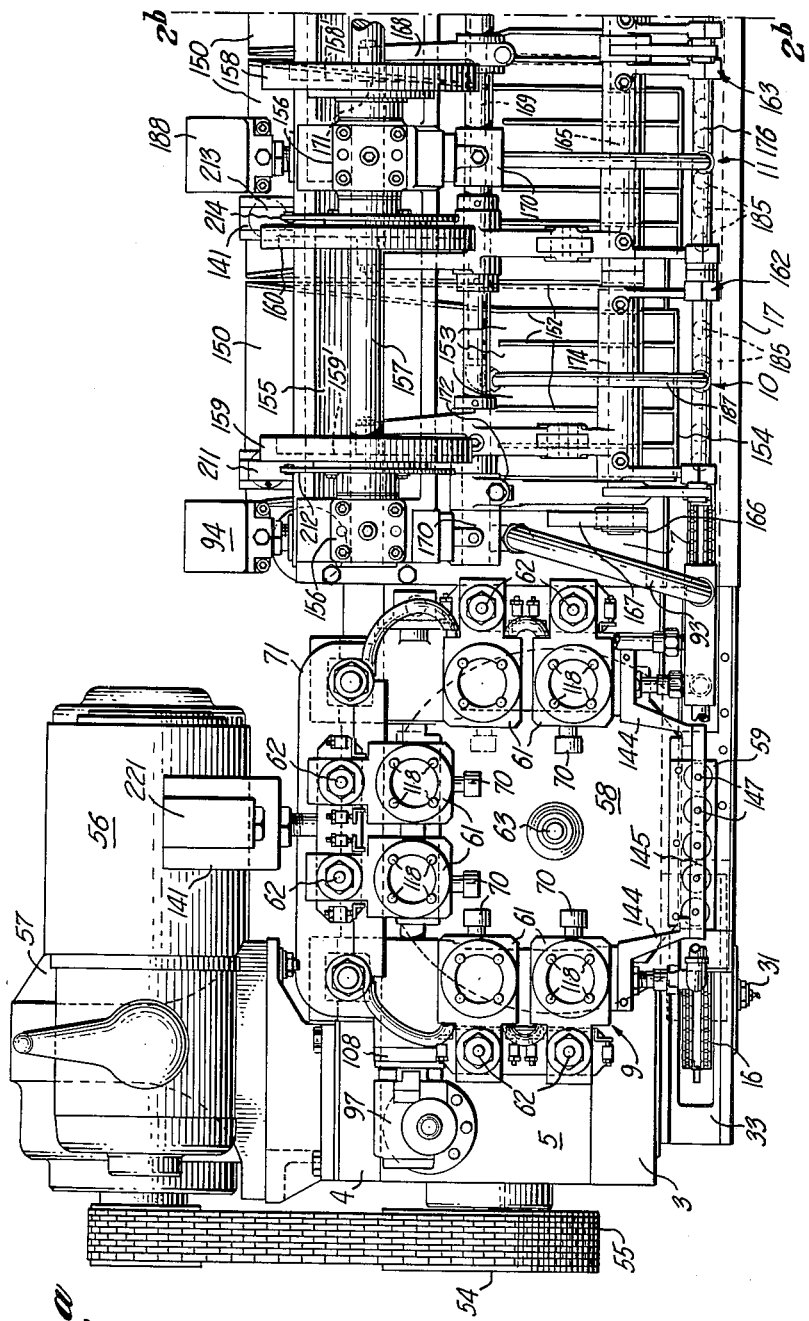

INVENTORS
James R. Flanagan and
Penrose R. Hoopes
BY Mason, Fenwick & Lawrence
ATTORNEYS

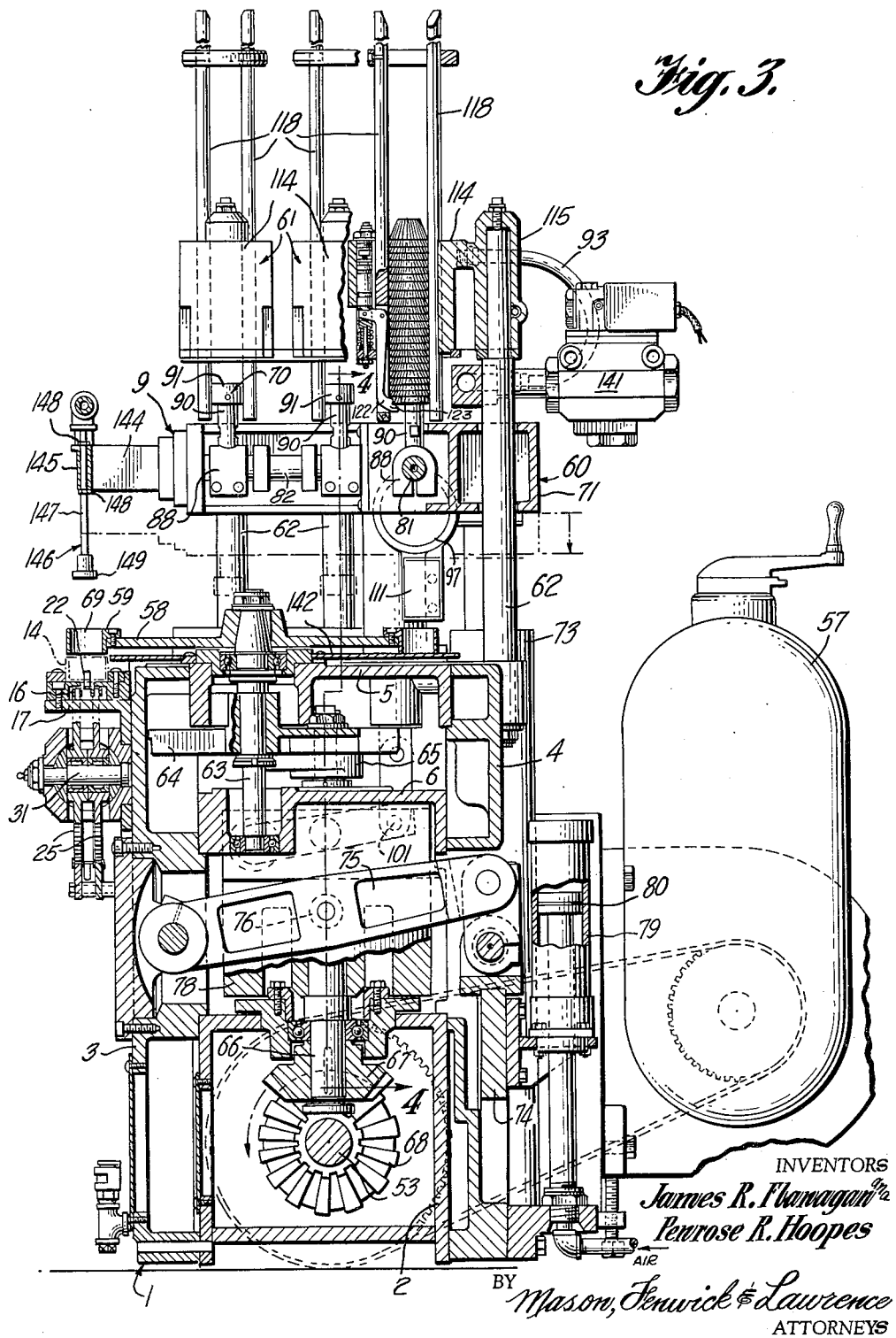

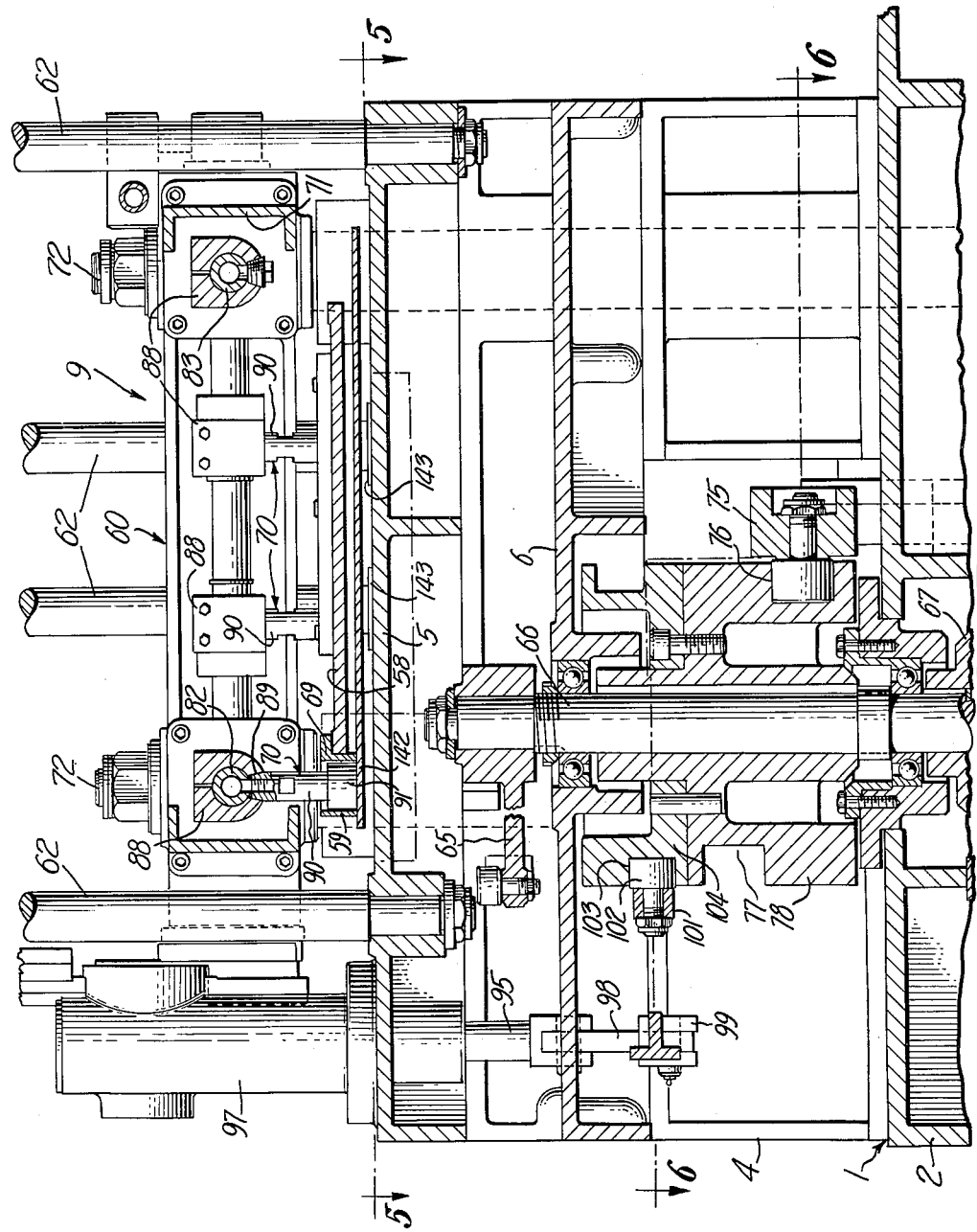

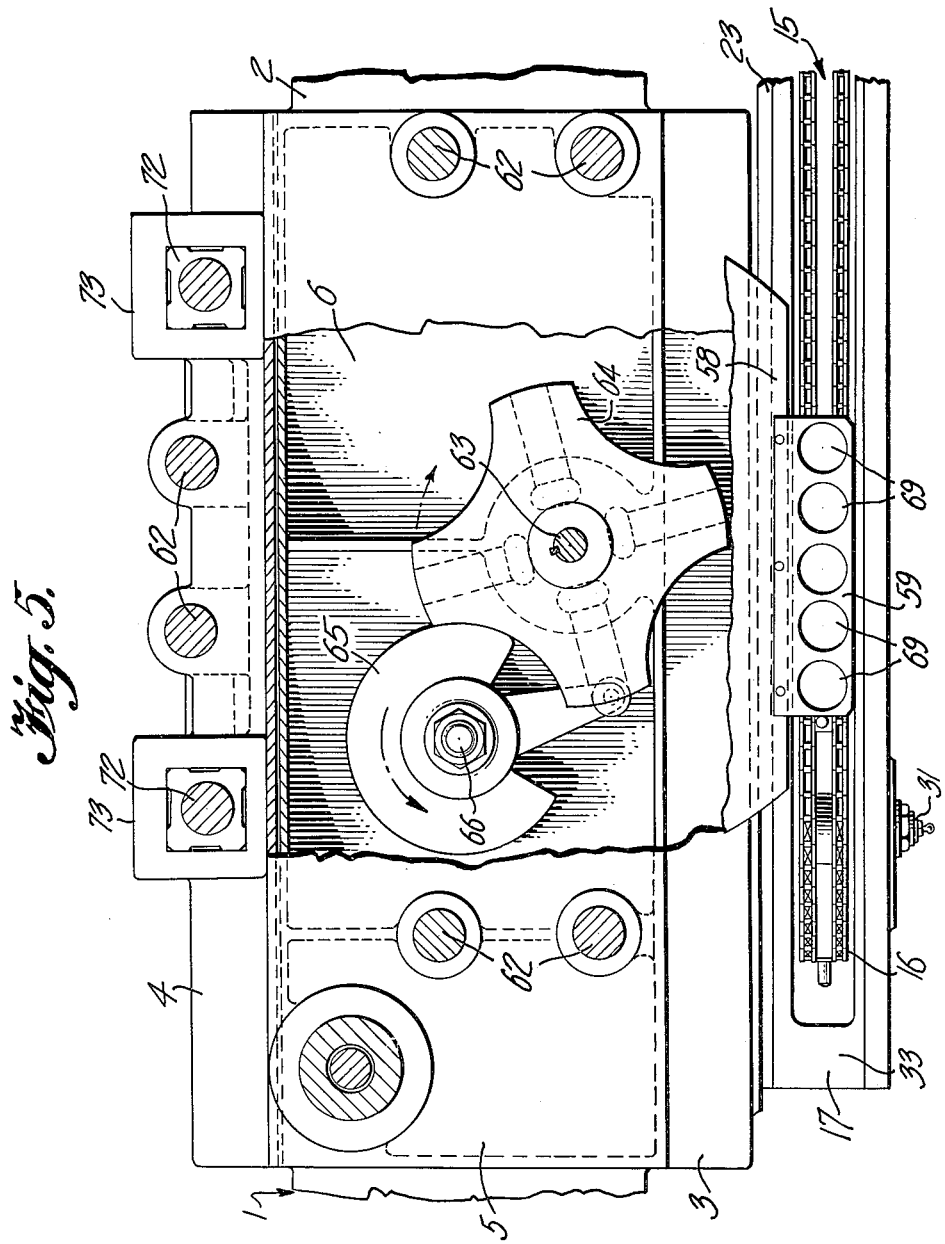

March 28, 1961   J. R. FLANAGAN ET AL   2,976,659
ARTICLE PACKING APPARATUS
Filed Sept. 17, 1958   19 Sheets-Sheet 8

INVENTORS
James R. Flanagan and
Penrose R. Hoopes
BY Mason, Fenwick & Lawrence
ATTORNEYS March 28, 1961 J. R. FLANAGAN ET AL 2,976,659
ARTICLE PACKING APPARATUS
Filed Sept. 17, 1958 19 Sheets-Sheet 11

INVENTORS
James R. Flanagan
and Penrose R. Hoopes
BY Mason, Fenwick & Lawrence
ATTORNEYS

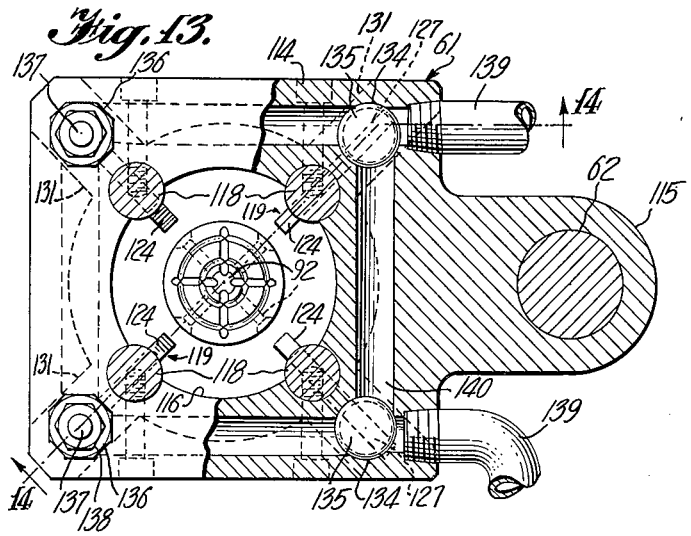
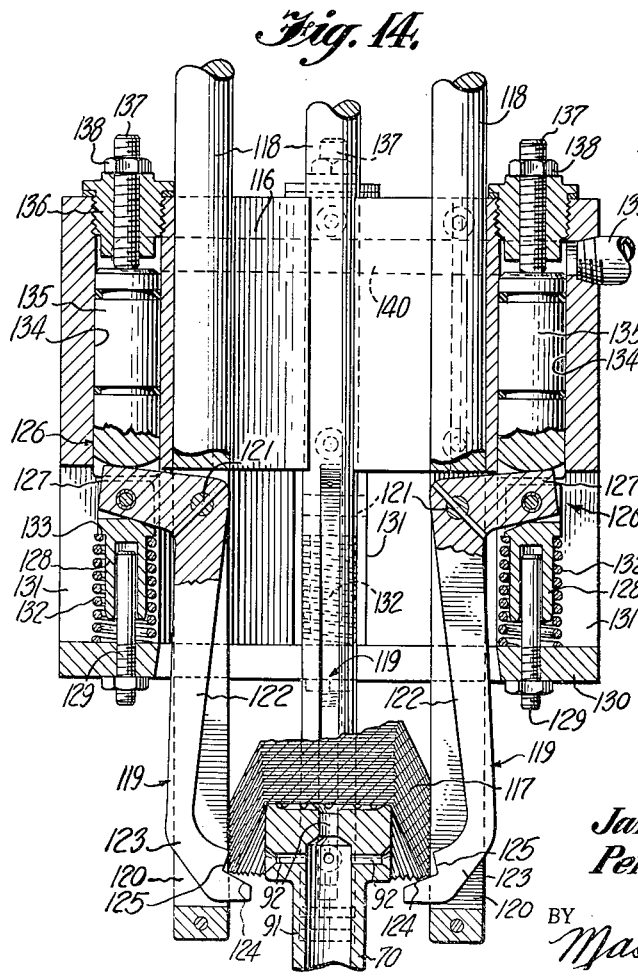
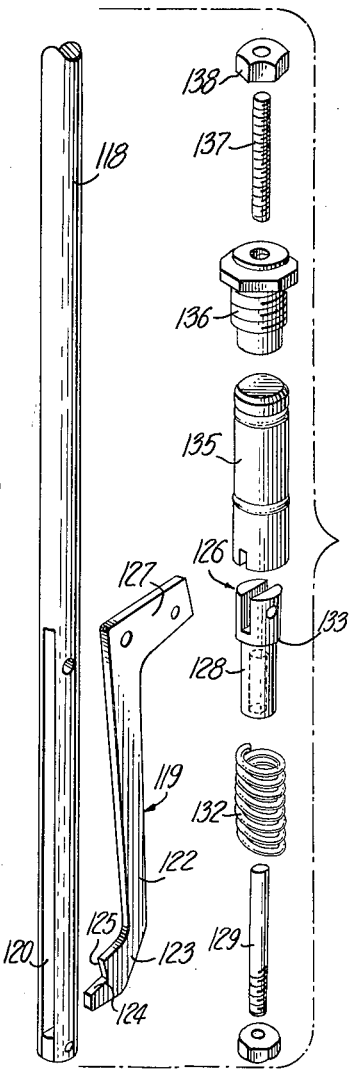

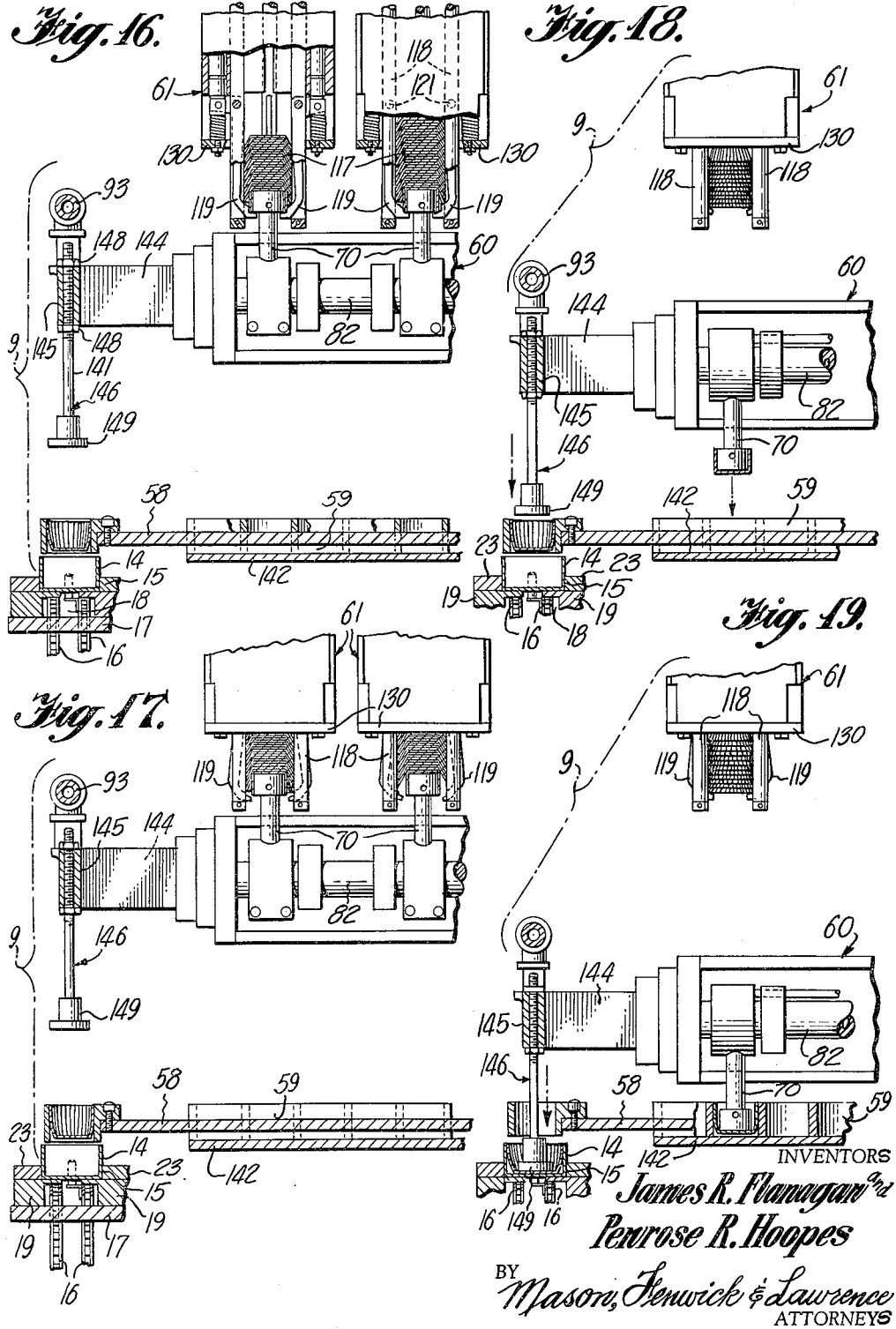

March 28, 1961

J. R. FLANAGAN ET AL 2,976,659

ARTICLE PACKING APPARATUS

Filed Sept. 17, 1958

INVENTORS
James R. Flanagan and
Penrose R. Hoopes

BY Mason, Fenwick & Lawrence
ATTORNEYS

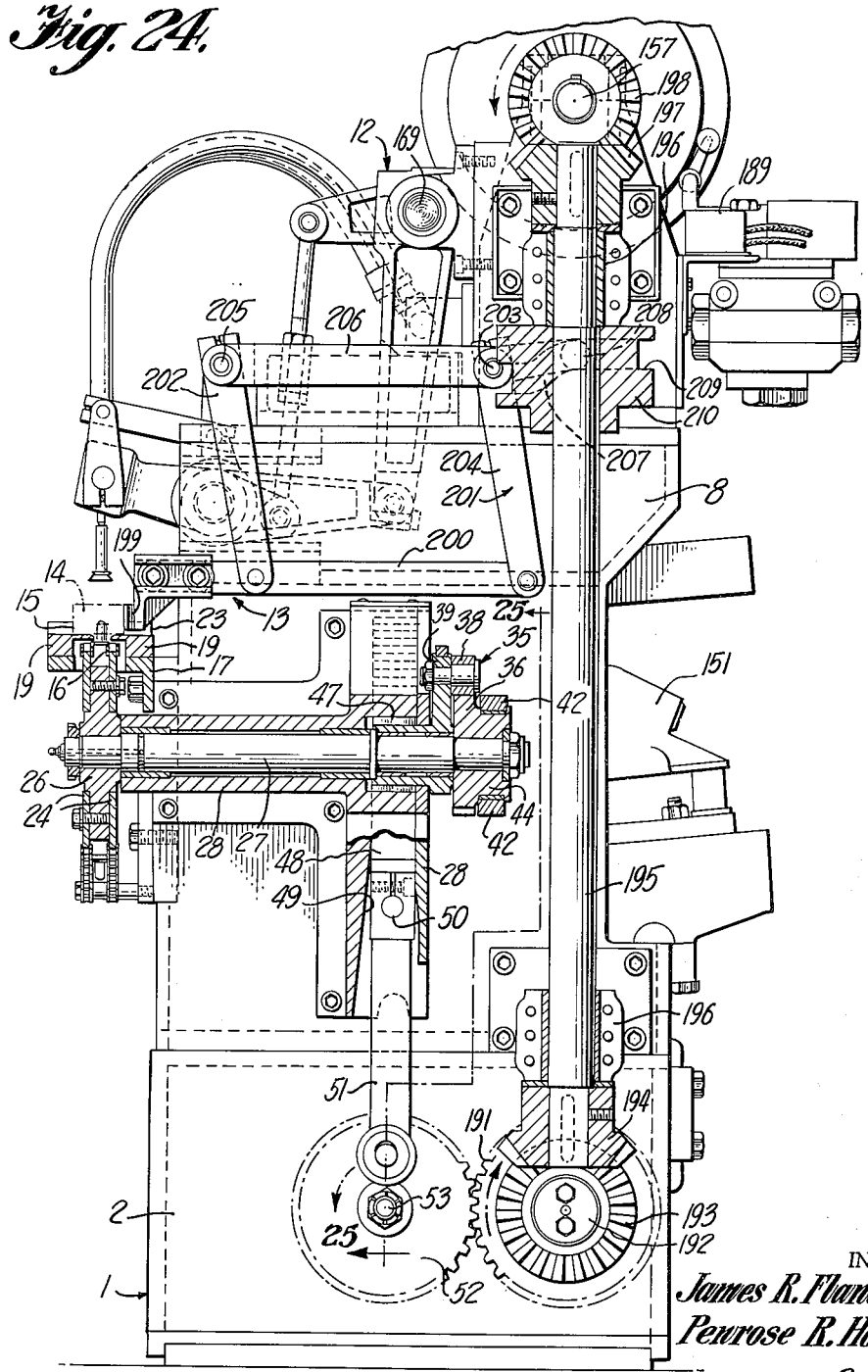

March 28, 1961  J. R. FLANAGAN ET AL  2,976,659
ARTICLE PACKING APPARATUS
Filed Sept. 17, 1958  19 Sheets-Sheet 17

INVENTORS
James R. Flanagan and
Penrose R. Hoopes
BY Mason, Fenwick & Lawrence
ATTORNEYS March 28, 1961   J. R. FLANAGAN ET AL   2,976,659
ARTICLE PACKING APPARATUS
Filed Sept. 17, 1958   19 Sheets-Sheet 18

INVENTORS
James R. Flanagan and
Penrose R. Hoopes
BY Mason, Fenwick & Lawrence
ATTORNEYS

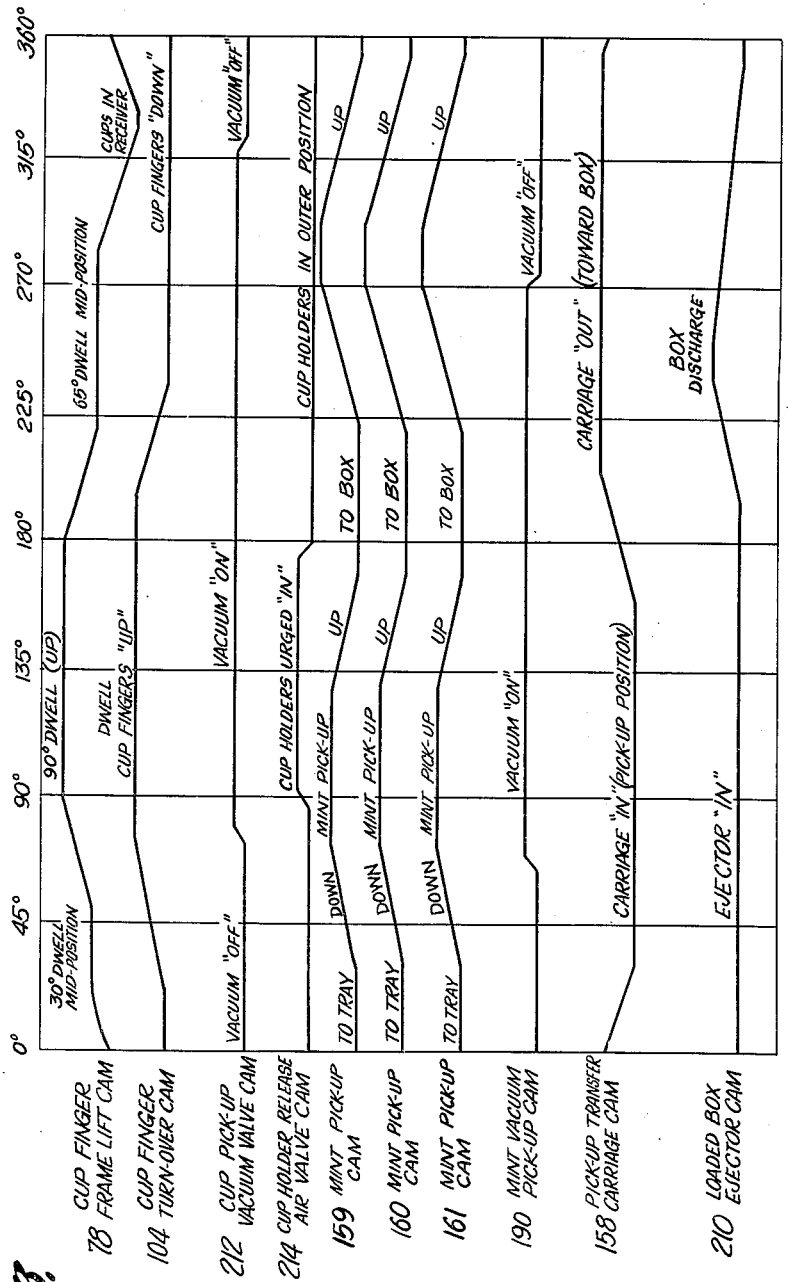

2,976,659
ARTICLE PACKING APPARATUS

James R. Flanagan, Marlton, N.J., and Penrose R. Hoopes, Philadelphia, Pa., assignors to Stephen F. Whitman and Son, Incorporated, Philadelphia, Pa., a corporation of Pennsylvania Filed Sept. 17, 1958, Ser. No. 761,561

40 Claims. (Cl. 53—237)

This invention relates to machines for packing candy, and particularly to machines for accumulating and assembling the items necessary to make up candy packages of the type in which the candy is placed in glassine cups, and the cups arranged in rows, in one or more layers, in boxes, or trays. The invention also relates to some of the mechanisms which form part of such a machine.

It is more or less standard practice to pack certain candies, particularly chocolates, by placing the candy pieces in glassine cups and arranging the cupped pieces in boxes. In certain cases, such as with chocolate covered mints which are relatively thin, it is common practice to place two or three pieces of candy in superimposed relation in a single glassine cup. These are placed in trays which are later put in boxes, or the trays wrapped, or the trays form the bottoms of elongated boxes over which covers are placed. These operations have been performed by hand, and consequently, add considerably to the cost of the package.

It is the general object of the present invention to provide a machine which will automatically place a plurality of glassine cups in a tray, or box bottom, and fill the cups with one or more candy pieces as desired.

A more specific object of the invention is to provide a machine which will accumulate and assemble in close adjacency a row of glassine cups and deposit the cups in a tray or box which is moved under the assembling mechanism.

Another object is the provision of a machine having such assembling mechanism which operates in a plurality of stages, and provides a very rapidly operating device by accumulating several cup rows at one time and performing the several stage operations on the different assemblies simultaneously.

A further object is to provide unique means for separating by mechanical means for delivery one glassine, or similar type cup from a stack of such cups held within a magazine.

Yet another object is to provide means for accumulating and assembling a row of cups, which means may be utilized to supply cups in rows of different number as desired.

A still further object is to provide a candy packing machine which will move a heterogeneous mass of candy to be packed, and arrange it in predetermined numbers of columns for packing, with the movement being quite gentle so that the candy will not be harmed.

Still another object is to provide such a machine wherein candy is lifted from a source of supply and deposited in rows in receptacles placed to receive the candy pieces.

Another object is to provide such a machine for packing candy wherein the basic movements of the machine relate to the placement of articles by rows, so that by replacement of certain parts the machine may be rendered operative to the packing of rows of different numbers of elements.

Other objects of the invention will become apparent from the following description of one practical embodiment thereof, when taken in conjunction with the drawings which accompany, and form part of, this specification.

In the drawings:

Figures 1a and 1b together illustrate the front elevation of a candy packing machine constructed in accordance with the present invention;

Figures 2a and 2b together illustrate the machine in plan;

Figure 3 is a vertical transverse section through the machine, showing a part of the drive and the general mounting of the cup accumulating and assembly mechanism, and is taken on the line 3—3 of Figure 1a;

Figure 4 is a detail view of a part of the drive and the cup accumulating mechanism, taken substantially on the line 4—4 of Figure 3 with the cup accumulating mechanism in its lowered position;

Figure 5 is a horizontal section taken on the line 5—5 of Figure 4, showing in particular the drive for the indexing dial at the cup accumulating station;

Figure 7 is a horizontal section through the cup accumulating mechanism and its drive and is taken substantially on the line 7—7 of Figure 1a;

Figure 13 is a view which is partially in top plan and partially in horizontal section through one of the cup holding magazines;

Figure 14 is a vertical section through the lower portion of one of the magazines, and is taken on the line 14—14 of Figure 13;

Figure 15 is an exploded perspective view of one of the cup retaining rods of the magazine, the cup holding arms at the lower end of the rod and appurtenant mechanisms;

Figure 16 is a vertical section taken on the line 16—16 of Figure 7, illustrating the cup accumulating mechanism in its raised position, with the lower cup of the stack being held against the cup placement arms of the accumulator head by the cup holding arms of the magazine;

Figure 17 is a view similar to Figure 16, illustrating the mechanism after vacuum has been applied to the head to retain the cup and the cup holding arms have moved to stack-retaining position;

Figure 18 is a view of the same mechanism with the accumulator drive having been rotated to lower the accumulator cup placement arms and with the entire accumulator head partially lowered;

Figure 19 is a similar view with the accumulator head in its fully lowered position;

Figure 20 is a vertical transverse section through the machine at the first candy loading station, taken on the line 20—20 of Figure 1a;

Figure 28 is a horizontal section through the mounting for the idler pulleys of the tray feeding chain and the chain tightening mechanism, and is taken on the line 28—28 of Figure 1a;

Figure 32 is a diagrammatic view illustrating the valves controlling the several vacuum lines of the machine, and their electrical operating and controlling means and circuits; and Figure 33 is a diagrammatic representation of the cam tracks of the various cams of the machine, showing their timed relation to one another during one complete cycle of operation of the machine.

Figure 1A:
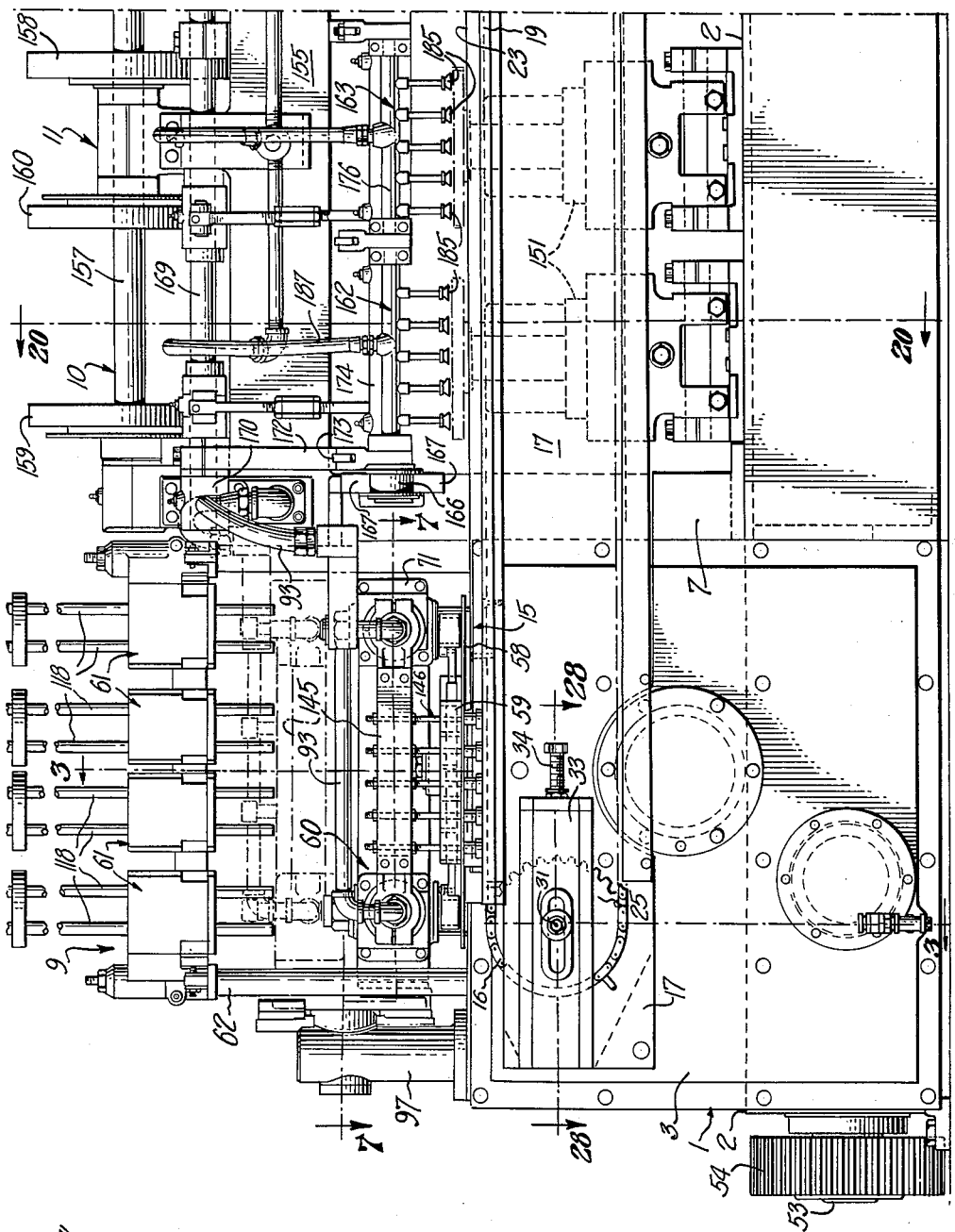

In general, the machine of the present invention receives trays, or box bottoms, from any convenient source and transports them along a path for presentation at a cup-receiving station, where they are loaded with paper or glassine cups, and then, sequentially, to one or more candy stations, where candies are placed in the cups. At the cup-receiving station, means are provided for accumulating cups from a plurality of magazines, arranging them in rows in an assembly bar, and then depositing them in the trays, or boxes. At the candy stations, the candy pieces are automatically arranged in predetermined numbers of columns and transferred, one from each column simultaneously, in the form of a row, into the cups previously arranged in the tray. After the cups are filled as desired, the trays are ejected from the machine.

It will be apparent after gaining a complete understanding of the machine, that the machine may be used to pack candles in various forms and arrangements with but slight variation from that disclosed herein. However, in order to simplify the disclosure, the machine is shown in a form suitable for the packing of chocolate mints which, as set out above, are packed several pieces in a cup with but one row of cups in a box.

Referring to the drawings in detail, the machine is mounted upon a suitable base frame 1. As any appropriate frame will suffice, and the frame forms no part of the invention, it will be described only in a general way.

The main portion of the frame consists of an inverted U-shaped member 2 which extends the full length of the machine. Its width at various places along the machine is in accordance with requirements in that particular area. At the entrance end of the machine (the left end as viewed in Figure 1a) the base is built up to house the principal drive mechanisms by means of a front plate 3 and a back plate 4, connected to the U-shaped member 2 and projecting above it. These plates are bridged at the top by a top plate 5, and at a mid area by an intermediate plate 6. The only other portions of the frame that need be mentioned are vertical standards 7 and 8 fixed to the top of the member 2 at a mid point along its length and at the exit end of the machine, respectively.

The frame forms a support upon which is carried a paper, or glassine, cup accumulating and assembling station 9, located at the entrance end of the machine, above the frame top plate 5, a first candy loading station 10 adjacent the standard 7, and in sequence thereafter, a second candy loading candy station 11, a third candy loading station 12, and an ejector station 13 at the exit end of the machine adjacent the standard 8.

Trays, or boxes, 14 are transported step by step along a tray path, or track, 15 to each of the several stations by means of a conveyor 16. The conveyor and the track 15 are supported upon an angle mounting plate 17, which extends horizontally the length of the machine frame and has its vertical web bolted to the front plate 3 of the frame and the front edges of the standards 7 and 8.

The tray path 15 and a conveyor chain trough 18 are constructed upon the top horizontal flange of the mounting plate 17. The chain trough is formed by two undercut stringers 19, placed along the side edges of the top flange of the plate 17 with their overhanging lips 20 extending toward one another and spaced apart to provide a slot 21 through which chain lugs 22, connected to the chains 16, may project and travel. The top flights of the conveyor chains will move in the trough 18, supported on the top flange of the plate 17. Guide rails 23 are placed along the stringers 19 to define the side edges of the tray path. The trays, or boxes, will ride upon the tops of the overhanging lips 20 of the stringers, pushed along by the chain lugs 22.

The conveyor consists of a pair of chains carried on drive sprockets 24 and idler sprockets 25. The drive sprockets are mounted upon opposite sides of a common flanged hub member 26, fixed to a shaft 27, journalled in bearings carried by a housing member 28, secured to the standard 8. Each of the sprockets 24 has an open center to fit around the hub member and against its flange, and has a plurality of arcuate slots 29, in circular arrangement, through which bolts 30 pass to secure the sprockets to the flange of the hub member. By loosening bolts 30, the sprockets may be rotatively adjusted relative to one another. The lugs 22 carried by chains 16 are arranged so that adjacent lugs are carried by opposed chains. Thus, by adjustment of the sprockets on the hub 26 the distance between adjacent lugs may be changed. This permits the lugs of one chain to engage the backs of boxes moving along the path 15, and the lugs on the other chain to engage the fronts of the boxes so that the boxes will be immovable relative to the chains. By adjustment of the chains, as described, boxes of different lengths may be accommodated, yet the trailing edge of one box will always be spaced the same distance from the next adjacent box regardless of the box size and chain adjustment. This, coupled with the fact that the chain has a uniform step by step movement, as will be described, ensures proper registry of the boxes with the several stations irrespective of the size of the box.

The idler sprockets 25 are independently mounted on a shaft 31 journalled in a yoke member 32 which is slidably mounted in a take-up frame 33, fixed to the mounting plate 17. The position of the yoke 32 with respect to the take-up frame 33 is determined by an adjustment bolt 34, swivelly mounted in the yoke and threaded through the frame 33. Thus, the sprockets 25 may be adjusted to control the tightness of the chains 16.

Shaft 27 is given an intermittent motion to advance trays along the tray path step by step by means of a ratchet drive 35. This drive can be understood with particular reference to Figures 24 to 27, inclusive. As mentioned above, the conveyor drive is mounted within housing 28 and the shaft 27 has fixed to it a ratchet member 36. In the form shown, the ratchet has but two teeth 37 so that the shaft will be given a rotative movement of 180° each operation. The ratchet is actuated by means of a pawl 38, carried on a lever arm 39 which is rotatably mounted on the shaft 27. The pawl is pivotally connected to the lever and is biased toward ratchet-engaging position by means of a spring 40, which has one end seated on the top of the pawl and the other end seated in a bracket 41 attached to the top of lever 39. The ratchet, and consequently the shaft 27, are held against overrunning at the end of the forward movement of the pawl, and also against reverse rotation when the pawl is making its inoperative return, by means of a pair of brake members 42. The brakes are pivotally connected to the housing 28 upon pins 43, and they are held in frictional engagement with a collar 44, formed integral with the ratchet 36, by means of a bolt 45 which carries a spring 46.

Lever 39 is caused to oscillate by means of a rack and pinion. The pinion 47 is integral with the lever 39 and is in mesh with a vertically extending rack 48. The rack is movable in a vertical guideway 49 formed within the housing 28. The lower end of the rack is bifurcated and connected by means of a pin 50 to one end of a pitman 51 which has its opposite end attached at an eccentric point on a gear 52 fixed to a shaft 53, which is the principal drive shaft of the machine and extends the full length of the machine, being journalled at appropriate places on the base frame. At the opposite end of the machine, shaft 53 carries a sprocket 54 driven by chains 55 from a main power plant, which includes a motor 56 and a suitable gear reducer 57.

It will be clear that motor 56 will cause continuous rotation of shaft 53 and that this motion, by means of the rack and pinion and ratchet and pawl, will be converted to a step-by-step movement so that the shaft 27, the driven sprockets 24 and the feed chains 16 will be driven intermittently. This will cause the chains to advance step-by-step, and transport trays from one station of the machine to the next throughout the full tray path.

When the trays are first placed upon the feed chain 16, either by hand or by conveyor from a suitable source, they are moved first to the cup-accumulating and assembly station 9. There, an indexing dial 58 moves assembly bars 59, which it carries, by a step-by-step motion sequentially beneath several operating mechanisms of a transfer head 60 which withdraw cups singly from a plurality of cup magazines 61 and deposit them in the assembly bars. The cup magazines are supported upon posts 62 rising from the top frame plate 5, one above each of the operating instrumentalities of the transfer head 60. In the embodiment shown, there are six cup magazines arranged in U-shape, with two on each leg of the U and two on the bridge member.

The indexing dial 58 is mounted on a vertical shaft 63, journalled in the top plate 5 and the intermediate plate 6. This shaft carries the driven element 64 of a conventional Geneva drive. A driver 65 imparts intermittent rotative movement to the driven element 64, and holds the element against rotation between steps of movement in well known manner. The driver 65 is fixed to the top of a shaft 66 which is journalled in the intermediate plate 6 and the top of the frame U member 2. Shaft 66 carries at its bottom a bevel gear 67, which is in mesh with another bevel gear 68 mounted on the principal drive shaft 53. It will be apparent that whenever the drive shaft 53 is in operation, the driver 65 will rotate the driven element 64 through intermittent steps of 90° amplitude and thus the indexing dial will receive the same movement. This will cause the assembly bars 59 to be moved from a position overlying the tray path 15 to a position under the cup magazines 61 at the left side of the U formation, as viewed in Figures 2a and 7, then to a position beneath the magazines at the bridge of the U, then to the magazines at the right leg of the U, and finally back to a position overlying the tray path. There will be an appreciable dwell at each one of these positions to allow time for the transfer head to operate to remove cups from the magazines and deposit them in the assembly bars.

It is to be noted that each assembly bar is provided with a row of spaced openings 69 to receive the cups. These openings are rather close together and of such size that they will hold the crinkled or corrugated sides of the glassine cups slightly constricted to provide the necessary friction to maintain the cups in position in the openings. The spacing between the openings will be such that when the cups are moved into the trays and unrestricted, they will be about in contact with one another. The transfer bars shown have five openings but it will be noted that the transfer bar is mounted to one side of the center line of the indexing dial. This will permit substitution of assembly bars having six openings when it is desired to pack that number of candies in a row. As mentioned above, the assembly bars move to positions under each section of the transfer head and, due to the fact that four bars are provided on the dial, there will be one assembly bar under each section of the transfer head and one over the tray path after each indexing movement of the dial.

The transfer head 60 carries a plurality of cup placement arms 70, which are movable through 180° of rotation from a vertical upright position to a vertically depending position. When the arms are in their upright position, the entire transfer head moves upwardly, so that the arms enter the cup magazines. When the cups are in position on the arms, the transfer head lowers, the arms rotate to their lower positions, and the head continues its downward motion to place the cups in the openings in the assembly bars.

In order to accomplish this action, the transfer head is built within a substantially U-shaped frame or housing 71. This housing is supported upon vertical rods 72 which are slidably mounted for vertical movement in guides 73 fixed to the rear of the main frame. Rods 72 are connected at their lower ends to a cross head 74, connected at its mid section to a lever 74 pivotally mounted on the front plate of the main frame. The lever 75 carries a cam follower roller 76 which works within a groove 77 in a cam 78 mounted on the shaft 66.

As the transfer head and its operating mechanism is comparatively heavy, an air cylinder 79 is used to cushion the lowering movement of the head so as to prevent jars. The cylinder is attached to the cross head 74 so as to move with it, and has a piston 80 which is fixed to the machine frame. The cylinder serves in effect as a dashpot.

Figure 7:
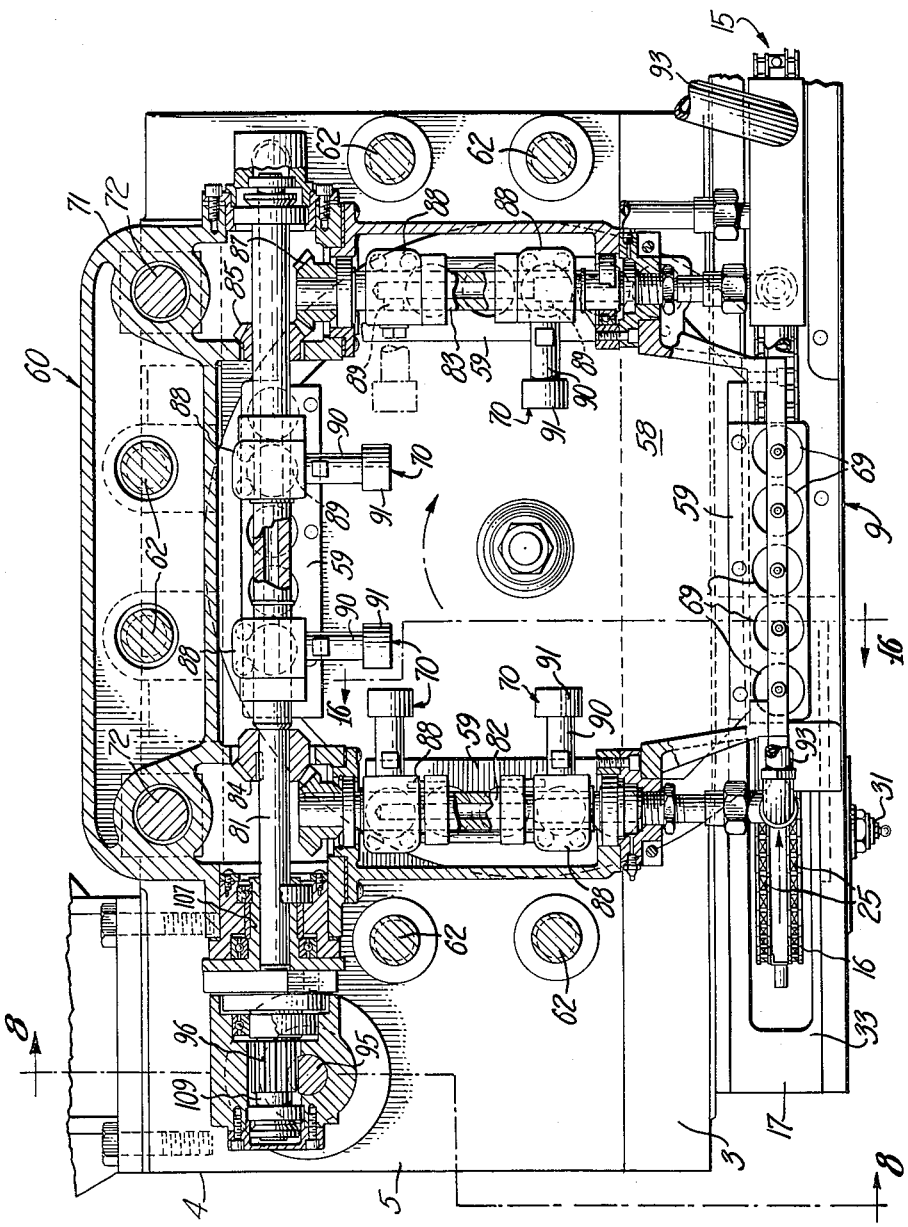
Figure 8:
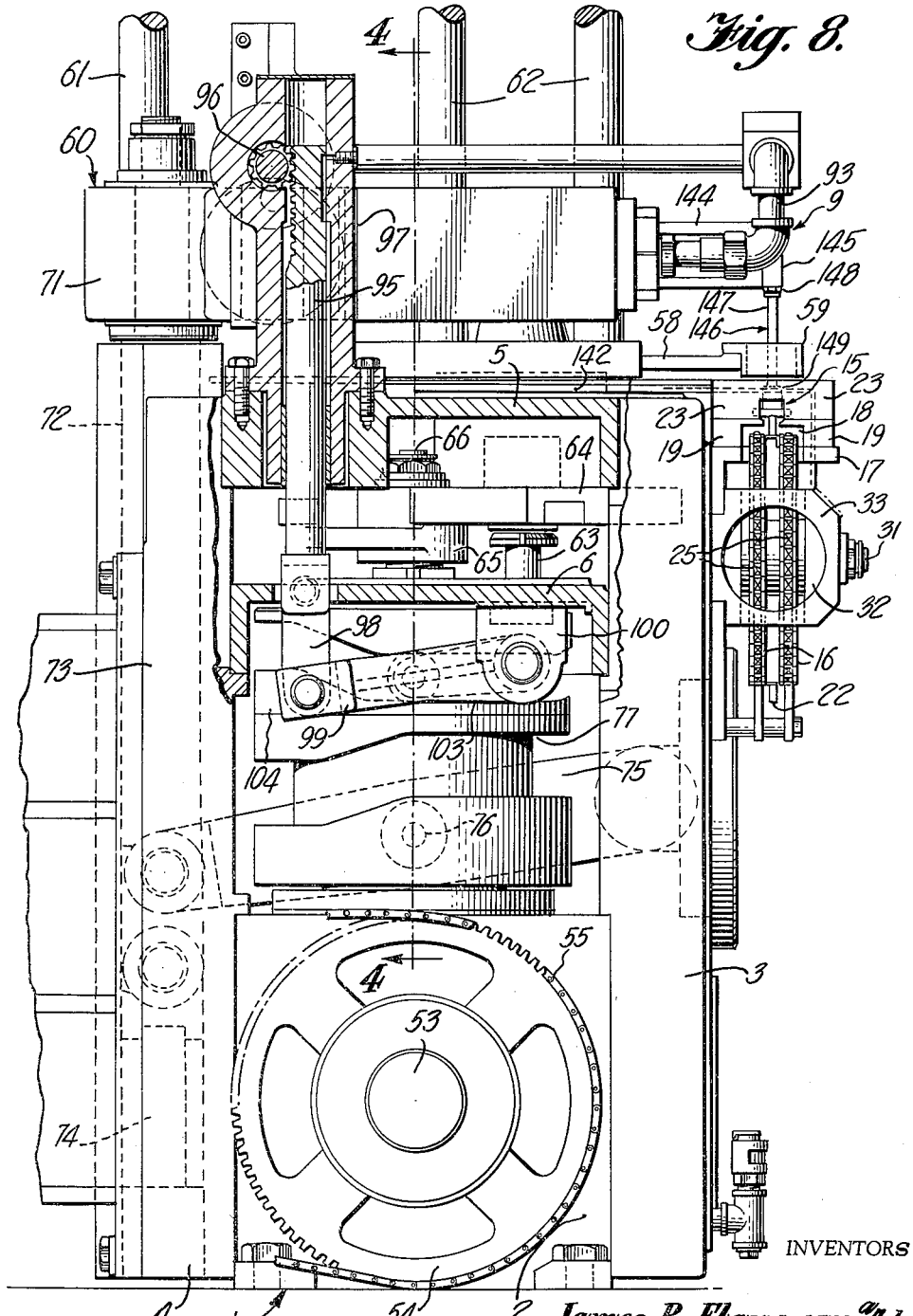
Figure 8 is a view partly in end elevation and partly in vertical section illustrating further details of the accumulator drive and is taken on the line 8—8 of Figure 7.

Within the U-shaped housing of the transfer head there are three oscillatable shafts, a main shaft 81 which extends the length of the bridge portion of the U-shaped frame and the two short shafts 82 and 83 which extend along the legs of the U-shaped frame at the left and right, respectively, as viewed in Figure 7. These shafts lie directly beneath the pairs of magazines 61 which form the legs and bridge of the U-form mentioned above. Shaft 81 carries bevel gears 84 and 85, meshed respectively with the gear 86 on the shaft 82 and gear 87 on the shaft 83. All three of these shafts are hollow and form part of the vacuum lines to the transfer head as will be described. Each of the shafts carries a pair of coupling members 88 to which the cup placement arms 70 may be connected. The couplings are drilled, as in 89, to provide communicating openings with the hollow centers of the respective shafts. Each of the cup placement arms 70 consists of a tube 90, which in effect forms the arm, and a head 91 fixed to the end of the tubular arm. The hollow arm is connected to the couplings so that they are in communication with the openings 89, and the heads 91 are provided with a plurality of openings 92, which openings form vacuum orifices for gripping the glassine cups. Hose lines 93 connect the several shafts to a source of vacuum, and these lines are under the control of a valve 94 which is solenoid operated and controlled in a manner which will be described.

The cup placement arms must be oscillated as mentioned above, and therefore means are provided to oscillate the shaft 81 and, through the described gearing, the shafts 82 and 83. It is to be pointed out that the gearing is so placed that the arms 70 all move through arcs which extend inwardly of the U-shaped frame or housing of the transfer head. The means for oscillating these shafts cannot be a straight drive due to the fact that the transfer head raises and lowers and the oscillation must take place at an intermediate position of the head.

Figure 6:
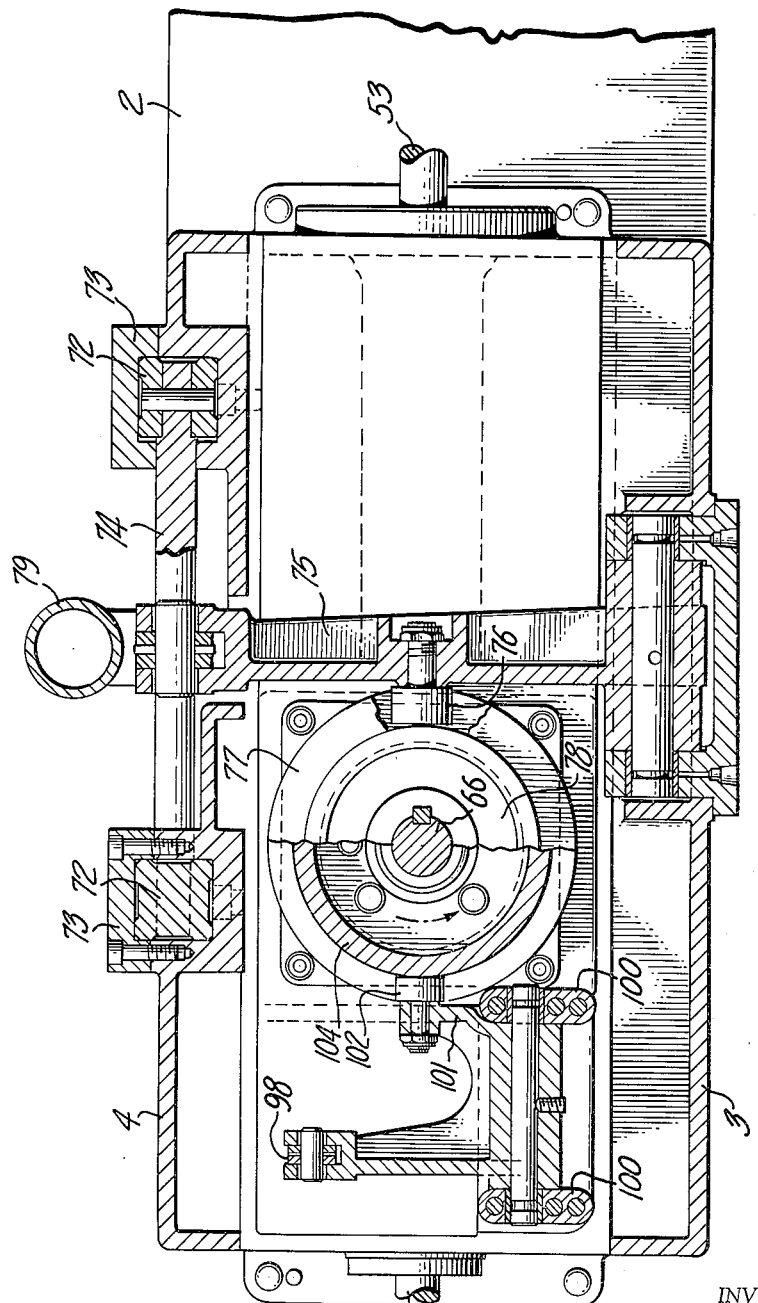
Figure 6 is a horizontal section taken on the line 6—6 of Figure 4.

The primary moving force for oscillating the shafts consists of a rack 95 and pinion 96. These parts are mounted in a casting 97 which is bolted to the top plate of the frame. The rack is slidably mounted in the casting and connected at its lower end to a link 98 which, in turn, is connected to the free end of a lever 99. The lever is pivoted on bracket 100, fixed to the underside of the intermediate frame plate 6. Lever 99 has a second arm 101 (see Figure 6) which carries a roller 102 riding in a groove 103, and a cam 104. Cam 104 is mounted on shaft 66 directly above cam 78. The cam and lever are designed to provide reciprocating movement to the rack 95 during an intermediate portion of the lifting and lowering movements of the transfer head 60, and primarily during a dwell in this movement, as will be described. Pinion 96 is journalled in the casting 97 and carries an eccentric block pivotally mounted on a crank pin 106.

This much of the driving mechanism is fixed, in that it is carried by the journalled pinion and has no lifting movement except that incidental to its rotational orbit. This drive is to furnish the oscillatory movement necessary to the shaft 81 of the transfer head and from that shaft to the shafts 82 and 83, which head, as previously pointed out, has a vertical path of movement.

Figure 9:
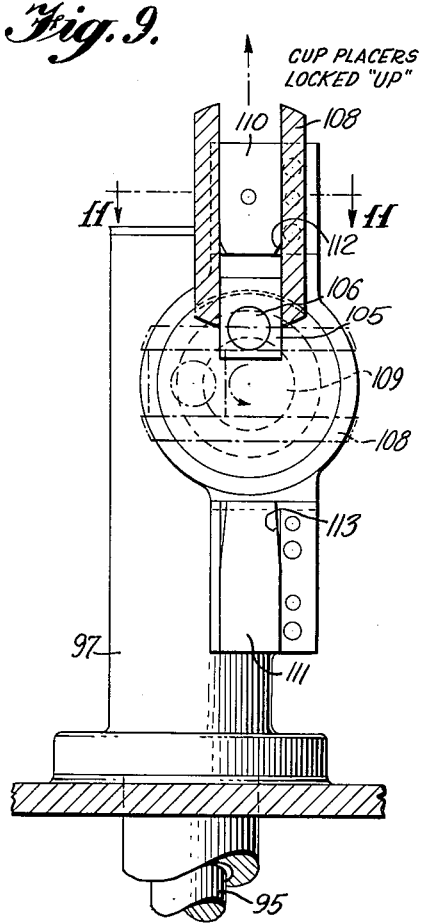
Figure 9 is a detail view showing the accumulator position control means, taken on the line 9—9 of Figure 7, illustrating the mechanism in its raised position in full lines and its intermediate position in dotted lines.
Figure 10:
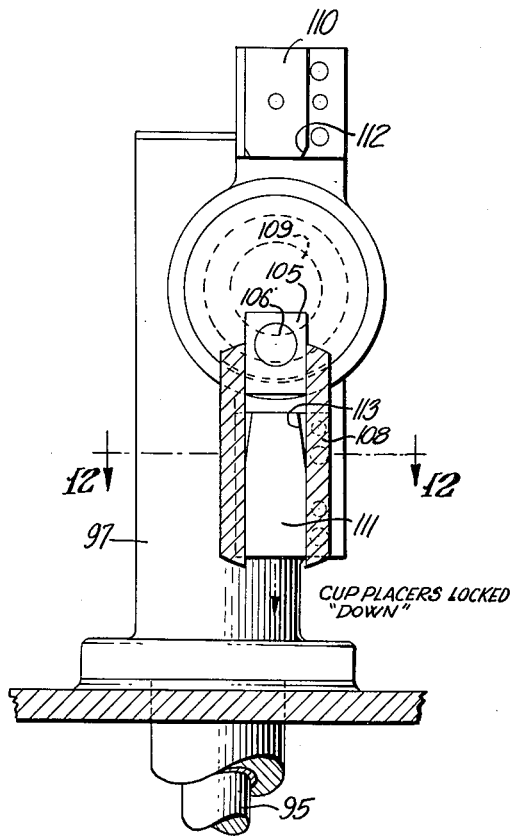
Figure 10 is a view similar to Figure 9 showing the mechanism in its fully lowered position.
Figure 11:
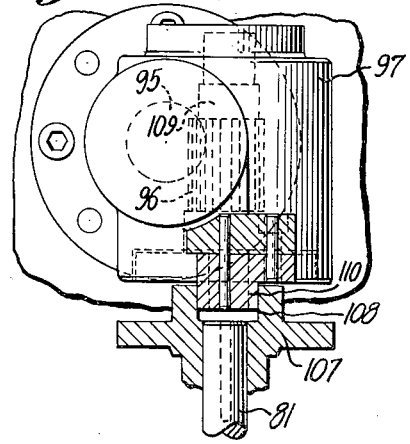
Figure 11 is a horizontal section through the drive mechanism for the accumulator, illustrating particularly the upper lock and positioning member, and is taken on the line 11—11 of Figure 9.
Figure 12:
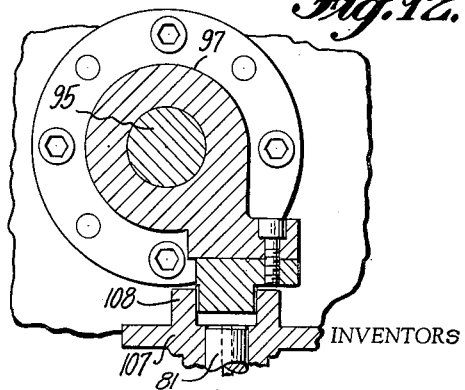
Figure 12 is a view similar to Figure 11, but showing the bottom lock, and is taken on the line 12—12 of Figure 10.

In order to connect these elements for driving operation, shaft 81 carries a hubbed flange 107, which has formed on its outer face a trackway 108 extending diametrically across the flange and intersecting the projected axis of the shaft 81. Block 105 rides in this trackway. The operative movements of this drive are illustrated in Figures 9 and 10. Figure 9 shows the trackway at its limit of movement in an upward direction, that is, the position which it assumes when the transfer head is fully raised. In this position the block 105 is at one end of the trackway and the track is in a vertical position. Figure 10 shows the mechanism in its other extreme position when the transfer head is fully lowered. Here again the trackway is vertically aligned but the block 105 is in its opposite end. It will be evident that when the transfer head is in an intermediate position, the trackway will bridge the axis of the pinion shaft 109, and the pinion shaft and shaft 81 of the transfer head will be in substantial alignment. At that time, block 105, being offset from the axis of the pinion shaft, will be in one end of the trackway so that upon rotation of the pinion the block will serve as a crank and rotate the trackway 108 and consequently the shaft 81 to which it is attached. The movement provided by cam 104 is such that the rack 95 will rotate the pinion 180° so as to reverse the position of the trackway 108. When the position of the trackway has been reversed, it will again be in a vertical position and the axis of the crank pin carrying block 105 will be in a vertical plane passing through the center of the pinion shaft and shaft 81 of the transfer head. Thus, the trackway is free to move downward or upward as the case may be, and the transfer head may complete its vertical travel.

It is absolutely essential that the cup placement arms 70 be vertically disposed in both their upwardly projecting and downwardly projecting positions, in order to insure the heads of these arms entering precisely within the centers of the cups of the magazines when the arms are in their upward positions and the transfer head moves vertically upward, and to enter precisely into the openings 69 of the assembly bars 59 when the cup placement arms are in their downward positions and the transfer head is lowered. To insure this relationship of the parts at the time of the placement arm entry into the magazine and into the assembly bar, upper and lower locking members 110 and 111 are provided. Both of these members are carried by casting 97 and held in fixed relation relative to that member. The entrance ends of these two members are tapered, as shown at 112 and 113. When the trackway has been rotated by block 105 to move the placement arms to upper position, the transfer head will continue its upward movement, causing the leading end of the trackway 108 to pass over the tapered end of the locking member 110, so that the trackway will be guided for the remainder of its travel in accordance with the fixed locking member. On the reverse movement of the transfer head, the guideway will pass over the lower locking member which will function in exactly the same manner.

As mentioned above, the placement arms of the transfer head are raised to vertical position and lifted to move into the cup magazines. Each of the magazines is constructed upon a base block 114 which has a laterally projecting boss 115 to receive the posts 62. The base blocks are open through the center to form a chamber 116 to receive a stack of glassine cups 117. In order to provide accurate positioning of the cups in the stack and, at the same time, reduce friction to a minimum so that the cups will gravitate downwardly, the base block is bored vertically at a plurality of places to receive guide rods 118. The openings for the rods 118 intersect the central opening of the base block so that vertical slots are formed in the walls of the chamber 116 through which a portion of the surface of the rods are exposed to project inwardly into the chamber 116 to provide spaced alignment points for the cups. The stack of cups is supported in the magazine upon a plurality of pivoted cup-holding arms 119 which are mounted in slots 120 in the bottoms of the guide rods 118.

The cup-holding arms 119 are in the form of small bell cranks and are pivoted to the rods 118 by pivot pins 121. The major portion of the principal lever 122 of the arm 119 lies substantially within the slots 120. These lever portions terminate at their lower ends in inwardly projecting fingers 123. The fingers are notched, to provide projecting lips 124 to underlie the bottom edges of the cup stack to support the stack, and upstanding shoulders 125 to engage the sides of the lower cups of the stack at predetermined times, as will be described. Arms 119 are normally held in the position shown in Figure 14, with the lip portion 124 of the fingers 123 projecting out of the slots in the rods 118 to engage the bottom edges of the flared sides of the lowermost cup of the stack in the magazine. The fingers are of such length that they will not interfere with the free passage of the cup placement arms 70 between them and into the bottom of the cup stack.

The positioning of the fingers 123 is determined by control means indicated generally at 126, which actuates the operating lever portion 127 of the arms 119. The operating levers of the arms are pivotally connected to the upper ends of guide sleeves 128. These sleeves fit slidably over guide studs 129 which are secured in a closure plate 130 secured to the bottom of the base block 114 of the magazine. The sleeves operate within slots 131 cut into the bottom of the base blocks, which slots are closed by means of the plate 130. Coil springs 132 surround the sleeves and bear against the closure plate 130 and an annular shoulder 133 formed on the guide sleeves to urge the sleeves upwardly. This will serve to bias the cup holding arms 119 toward the position shown in Figure 14, which is the stack supporting position. The base blocks are drilled vertically to provide a plurality of cylinders communicating with the slots 131. Pistons 135 are mounted in each cylinder, and bear against the upper side of the operating lever portions 127 of the cup holding arms 119. The tops of the cylinders 134 are threaded to receive closure plugs 136, and the plugs 136 are centrally drilled and tapped to receive screws 137 which project below the bottoms of the closure plugs and serve as limit stops for the upward travel of the pistons 135 in the cylinders 134. The screws, after adjustment, are fixed in position by the lock nuts 138. By adjustment of the screws, the inactive position of the cup holding arms 119 may be determined. The operating lever of the cup holding arms will be pressed against the bottom of the pistons 135 by means of the spring pressed guide sleeves 128, to hold the pistons against the ends of the limit screws 137.

In order to remove cups from the stack, it is necessary that the side walls of the cup to be removed shall be free of support upon the projecting lips 124 of the fingers 123 of the cup-holding arms. In order to accomplish this, the fingers 123 are moved inwardly to press the sides of the bottom cup of the stack firmly against the peripheral surface of the head 91 of the cup placement arms 70, which has moved upwardly between the fingers and entered into the stack, lifting it slightly from its support position upon the lips 124 of the fingers on the cup holding arms 119. To accomplish this, pistons 125 are moved downwardly to rock the arms 119 about their pivots 121, so that the shoulders 125 on the fingers 123 will engage the sides of several of the cups at the bottom of the stack and press them inwardly, to bring the side walls of the lowermost cup tightly against the wall of the head 91 of the cup placement arm. The pistons are moved by air pressure, which enters the base block from an air line 139 and is distributed through conduits 140, which are in communication with the several cylinders 134. Passage of air through the line 139 is controlled by means of a valve 141. The operation of this valve will be described later.

When the cup holding arms have moved inwardly, and the sides of the bottom cup are against the head of the cup placement arm, valve 94 is actuated to connect the cup placement arms to a source of vacuum, so that the walls of the bottom cup will be held against the cup placement head. Air is then released from the cylinders 134, and the levers returned to their former positions by means of the springs 132. The edges of all of the cups which were pressed inwardly by the movement of the fingers, with the exception of the edges of the lowermost cup, will return to their normal positions as the fingers move outwardly. The walls of the lowermost cup, however, will be held tightly against the cup placement head by reason of the vacuum which is applied to that head. The transfer mechanism can now move downwardly, and the heads carry with them the bottom cup of the stack. As the cup placement arms move downwardly, the stack will be lowered so that the edges of the bottom cup will come to rest upon the projecting lips of the cup holding arms, and the stack will be again supported on these arms. As the transfer head moves downwardly, it will pause briefly at an intermediate point and the mechanism will operate to rotate the cup placement arms to their lower depending position, after which the transfer head will again take up its downward movement which will be continued until the cups are within the openings 69 in the assembly bars 59 and resting upon a pan 142, which is mounted upon feet 143 fixed to the top of the main frame. Valve 94 then operates to release the vacuum on the cup placement arms, and the normal resiliency of the cups cause their sides to move back toward their natural position. The openings 69 in the assembly bars 59 will stop this movement before the sides are fully opened, so that there will be a frictional hold on the cups to maintain them in the openings when the dial has rotated to bring the assembly bar off of the pan 142 and over the tray path 15.

The frame or housing 71 of the transfer head 60 carries a pair of brackets at the front ends of its side sections, which brackets 144 are connected to the ends of a bar 145 that carries a plurality of cup ejector plungers 146. The plungers have stems 147, which pass through openings in the bar 145, and are threaded to receive adjustment nuts 148. The ejector heads 149 are fixed to the lower ends of the stems 147. The heads are of such diameter that they will pass freely into the cups held in the opening 69 of the assembly bars 59 to eject cups from these openings into a tray 14 positioned beneath the assembly bar on the chain 16. It will be clear that the ejector plungers have no movement independent of the movement of the transfer head 60 in its vertical travel.

The above described mechanism will serve to accumulate cups from the various magazines and assemble them in the assembly bars of the indexing dial, move the dial to bring a filled assembly bar over the path of tray travel, and eject the cups from the assembly bar into a tray positioned beneath the bar. Thus, the tray will be supplied with a row of glassine cups. At this point in the operation the chain advancing means will operate to move the chain through one increment of movement and bring a cup filled tray to the first candy loading station 10.

In the embodiment disclosed there are three candy loading stations and the operation at each is identical. Some of the operating mechanism controls certain movements common to all three stations, and in this regard only one operating mechanism is necessary for the three, and other mechanisms are provided which are independent and duplicated at each station. As the movements are identical, with the exception of the amplitude of movement of certain of the candy handling mechanisms resulting from the placement of the candy in layers, only one mechanism will be described.

At each candy station there is an inclined candy table 150, supported upon a vibrator 151 which is mounted in turn upon the main base frame 1. The vibrator may be of any appropriate type such, for example, as that disclosed in U.S. Patent No. 2,821,292, issued to William B. Spurlin, January 28, 1958. The tables 150 are divided by partitions 152 into a plurality of longitudinally extending candy troughs 153. The partitions are arranged so that the troughs extend in the direction of declination of the table, and candies which are placed upon the back end of the table, either by hand or from a conveyor belt, will be caused to move by the vibration of the table into the several candy troughs and along them to the forward edge of the table, which is provided with an upstanding ledge 154 to serve as a barrier to hold the candies on the table. The number of troughs on the table will be equal to the number of cups which have been placed in the tray moving along the tray path. By the structure described, the candies will be arranged in rows with the leading piece of each row positioned against the ledge 154, so that a row will be formed transversely of the table against the ledge 154 having just the proper number of pieces to form a layer in the cups in the box on the feed chain.

Means for picking up the candy pieces from the tables and depositing them in the boxes on the chains is carried by the standards 7 and 8 of the frame. In order to support this mechanism, a channel member 155 is mounted upon the tops of the standards 7 and 8 and bridges the space between them. Several bearing blocks 156 are fixed to the top of channel 155 and journal a cam shaft 157. On this shaft are mounted a cam 158, which controls horizontal movement of the candy transferring carriages to be described, and cams 159, 160 and 161, controlling oscillation of the transfer carriages at the candy loading stations 10, 11 and 12, respectively.

Three transfer carriages 162, 163 and 164, one at each of the respective loading stations, are mounted upon a horizontal pivot shaft 165. This shaft carries rollers 166 at its ends, which rollers are mounted to ride on horizontal tracks 167 fixed to the standards 7 and 8. The shaft is caused to move back and forth along its horizontal path by means of a lever 168, fixed to a shaft 169, journaled in bearings 170, carried by the channel member 155. Lever 168 carries a roller 171 to ride in the groove 158' in cam 158. At the ends of shaft 169, there are downwardly extending levers 172 that have their lower ends pivotally connected to the outer ends of levers 173, which are fixed to the pivot shaft 165, thus, as cam 158 rotates, lever 168 will cause the shaft 169 to rock, moving levers 172 and 173 to draw the pivot shaft back and forth in the path defined by the tracks 167.

Each of the transfer carriages consist of a sleeve 174, loosely mounted on shaft 165, and having a pair of arms 175 projecting parallel to one another from the opposite ends of the sleeve. At their outer ends, the arms pivotally support a rock shaft 176 which carries a plurality of depending candy pick up heads 177. The number of heads, of course, will agree with the number of cups placed in the tray and the number of troughs on the candy table, and their position and spacing along the rock shaft will be in accordance with the positions of these other elements. The transfer carriage is caused to oscillate on the pivot shaft 165 by means of a control arm 178 which extends from the rear of the carriage. This arm is connected by a link 179 to a rocker arm 180. The rocker arm is pivoted intermediate its length on the shaft 169, and is connected at one end to the link 179 and carries a roller 181 at its other end. This roller is adapted to ride in the groove 159' of cam 159 mounted on the cam shaft 157. Movement of the rocker arm under the influence of the cam will cause the transfer carriage to oscillate about the pivot shaft 165.

Figure 23:
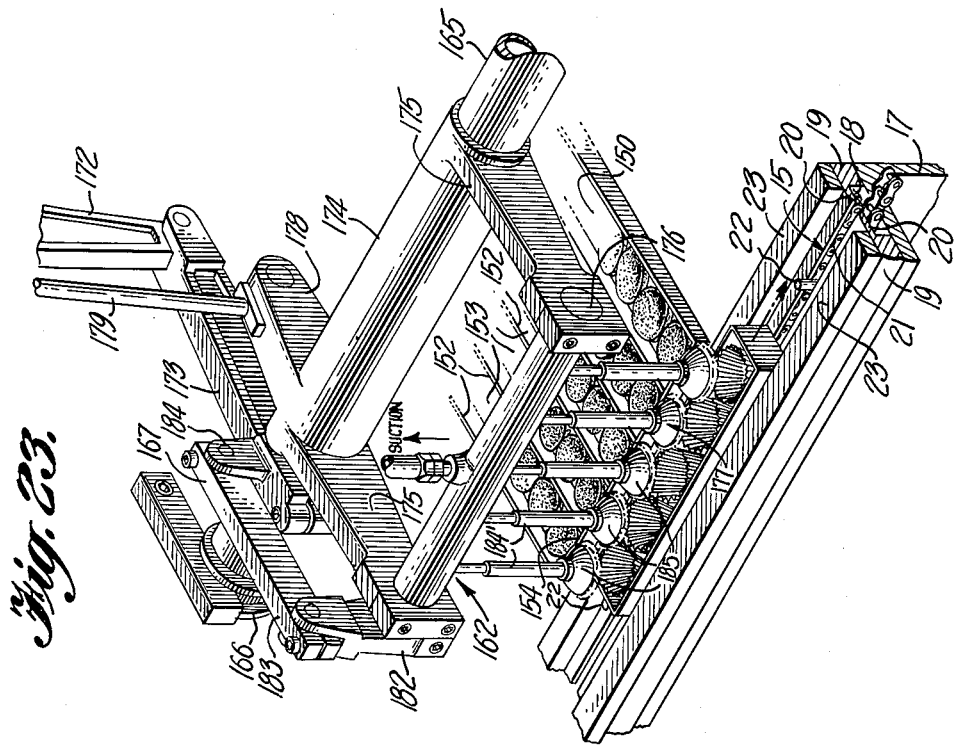
Figure 23 is a perspective view of a portion of one of the candy tables and the tray transport line, showing the candy pick-up arms and their operating mechanism.
Figure 24:
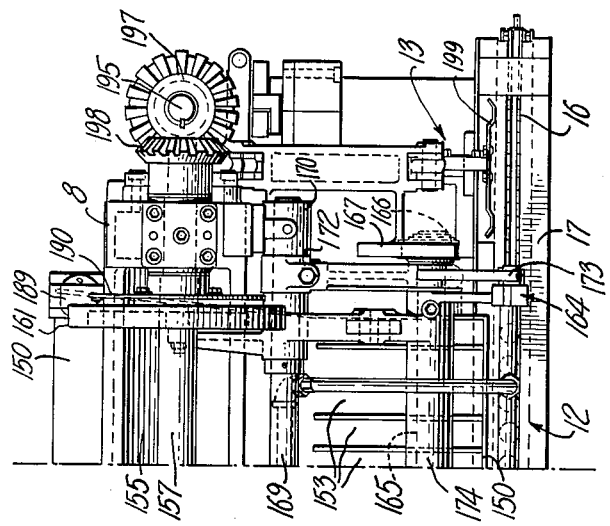
Figure 24 is a vertical section through the mechanism at the ejector end of the machine, illustrating part of the structure in end elevation, and is taken on the line 24—24 of Figure 1b.

Rock shaft 176 is provided with a fixed arm 182 which in turn is pivotally connected to a parallel bar 183. The other end of the bar is connected to an ear 184 projecting from the lever 173. It will be seen by an examination of Figure 23 in particular, that oscillation of the transfer carriage about the pivot rod will cause oscillation of the rock shaft 176. This will change the angle of the candy pick up heads with respect to the transfer carriage. By combined movements of the pivot shaft 165 and the carriages back and forth, and oscillatory movement of the carriages about the shaft, the pick up heads can be moved to various positions as required in the candy loading operation.

Figure 20:
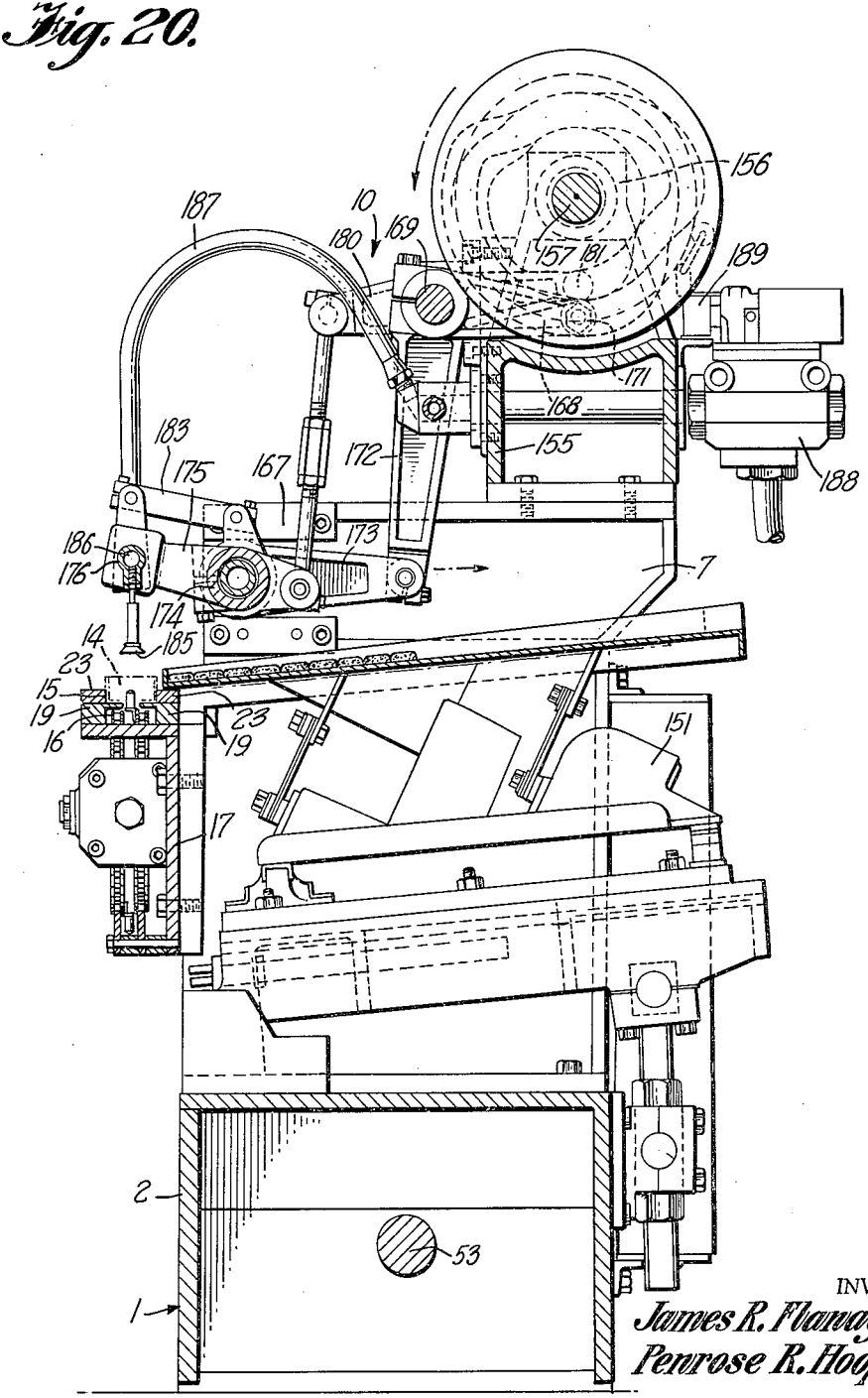
Figure 21:
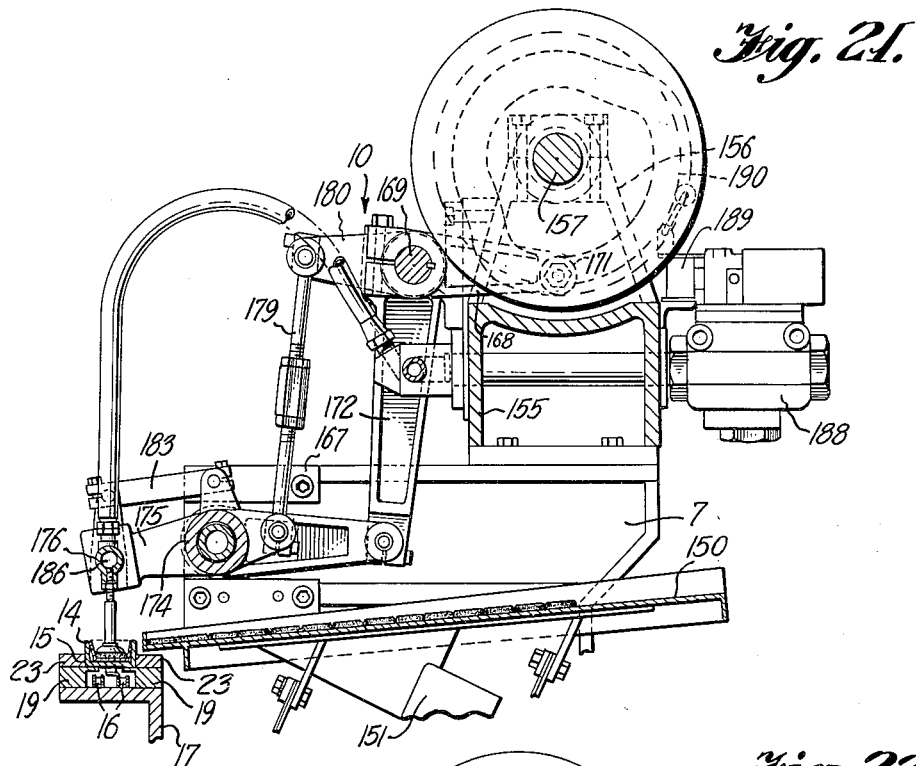
Figure 21 is a view similar to the upper portion of Figure 20, but showing the mechanism in position for depositing candy in cups in trays on the transporting chain.
Figure 22:
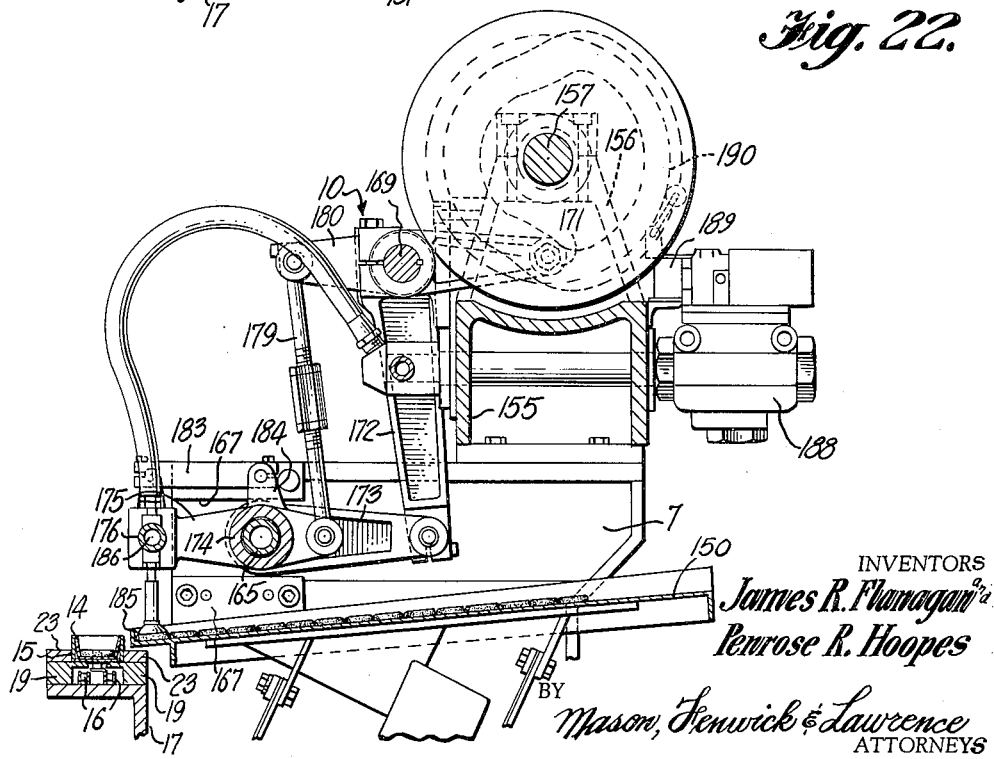
Figure 22 is similar to Figure 21 with the mechanism moved to position to pick up candy from the supply table.
Figure 25:
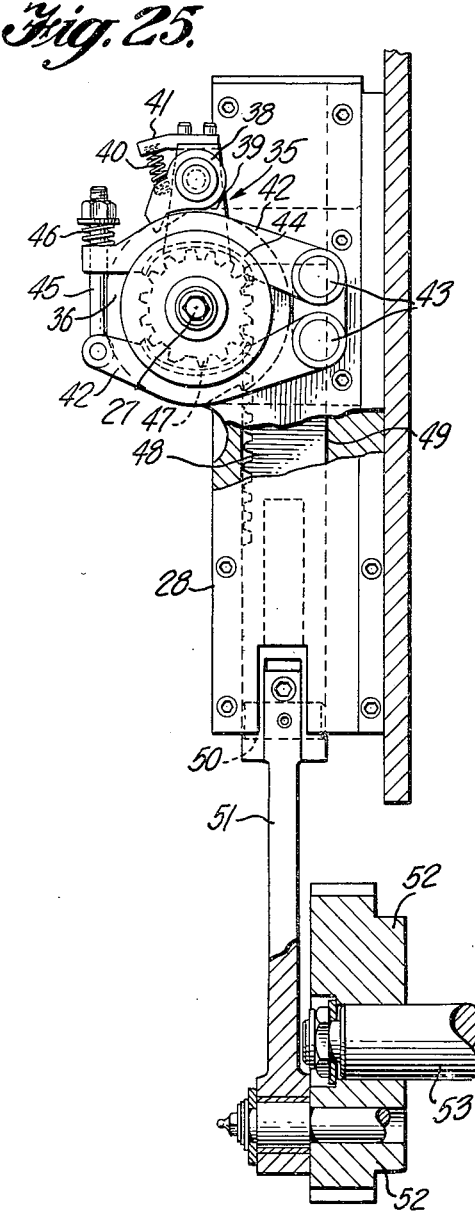
Figure 25 is a vertical section on the line 25—25 of Figure 24, showing the mechanism for intermittently driving the tray feeding chain.
Figure 26:
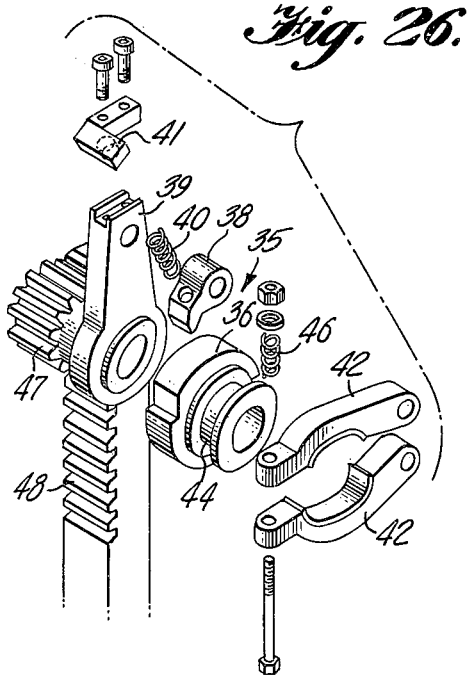
Figure 26 is an exploded perspective view of the operating parts of the mechanism shown in Figure 25.
Figure 27:
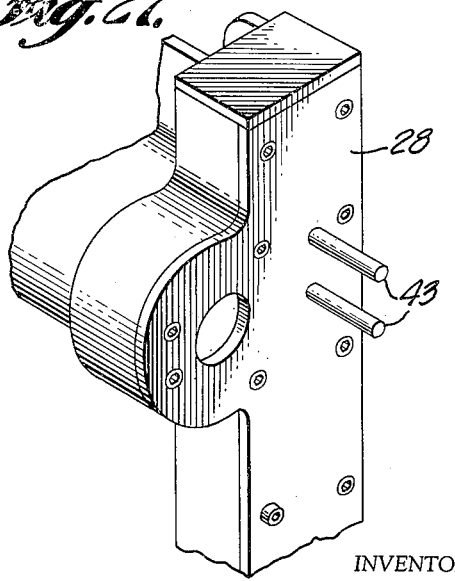
Figure 27 is a perspective view of the casing which houses the mechanism shown in Figure 26.
Figure 28:
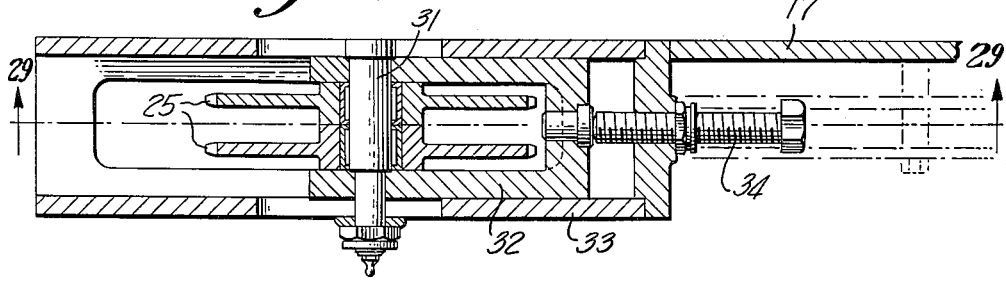
Figure 29:
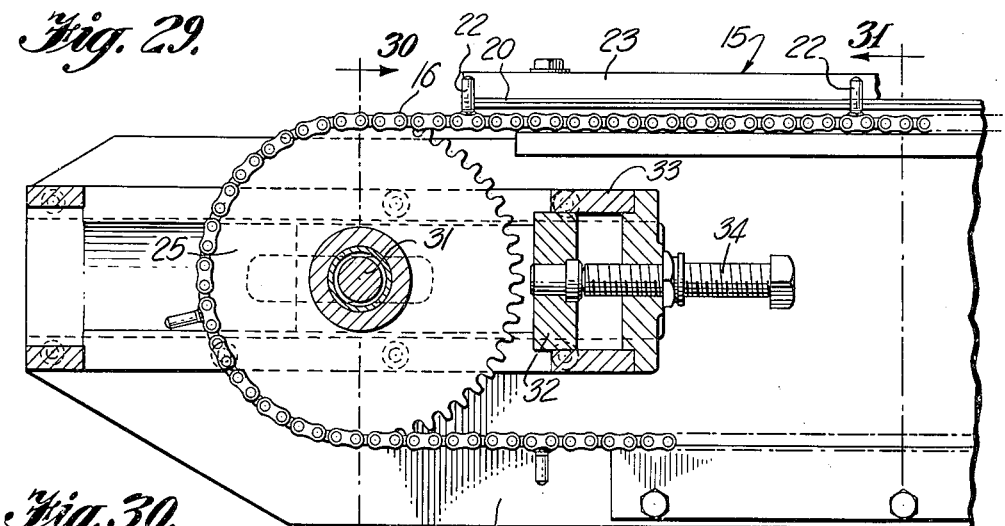
Figure 29 is a vertical section through the chain tightening mechanism, taken on the line 29—29 of Figure 28.
Figure 30:
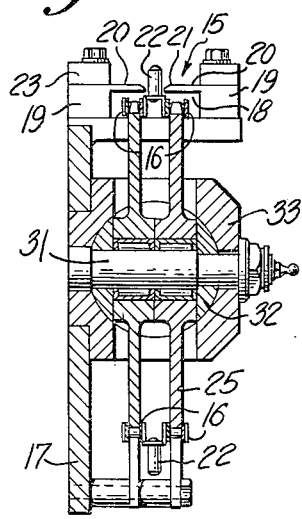
Figure 30 is a vertical transverse section showing the idler sprocket mount, taken on the line 30—30 of Figure 29.
Figure 31:
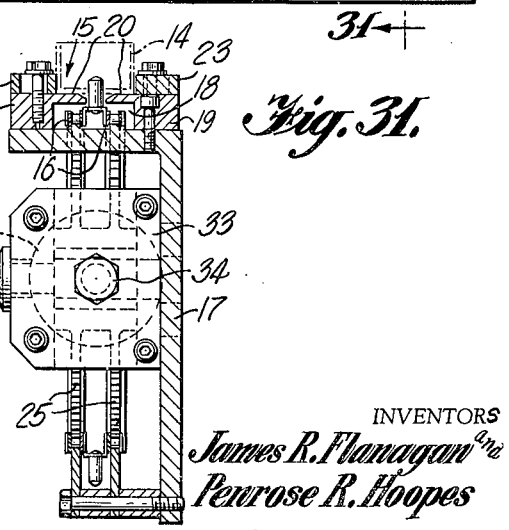
Figure 31 is a vertical section through the tray feeding chain and chain trough, taken on the line 31—31 of Figure 29.

Reference to Figures 20 to 22, inclusive, will show that the carriage can be moved forward, as shown in Figure 20, to place the pick up heads over a tray on the tray chain, and oscillation of the transfer head about the shaft 165 will cause the pick up heads to move in a straight line downwardly to deposit candies in cups in the tray, as shown in Figure 21. A reverse oscillation of the transfer carriage will lift the pick up heads, and the carriage can then be moved rearwardly and oscillated downwardly to place the pick up heads on top of the leading candies against ledge 154 on the candy table 150.

Each of the pick up heads consists of a tubular stem 184 and a vacuum cup 185. The tubular stems are in communication with the cored center 186 of the rock shaft 176, so that the shaft serves as a vacuum manifold for all of the pick up heads of that particular carriage. The open center of the shaft 176 is connected to a vacuum line 187 which is controlled by a valve 188. It will be understood that due to the fact that all of the loading mechanisms at the three stations operate simultaneously, their respective pick up heads can be connected to a common vacuum source, and that source controlled by the single valve 188. Valve 188 is a solenoid operated valve and is controlled by a micro switch 189, operated by switch cam 190 carried by cam 161. The switch cam is so designed that valve 188 will be actuated to apply vacuum to the pick up heads when the heads are in position over the candy table, as shown in Figure 22, and maintain that vacuum as the heads are lifted, moved over the candy tray and downward into the cups. When the candy is at the proper level, the valve 188 will operate to cut off the vacuum to release the candy from the pick up head. The pick up head is then free to lift and leave the candy in the tray.

At the loading station 10, the first candy pieces are placed in the cups as described. The pick up heads will lift and the feed chain 16 will advance the tray to the next loading station 11. The pick up heads at this station will deposit second candy pieces upon the first and, of course, the control cam 160 will be designed so that the pick up heads will only lower the proper amount to place the second pieces on top of the first. These heads will then lift, the chain will move another step and carry the box to the third station 12. At this station the operation is repeated, and cam 161 will provide even less amplitude of movement for the pick up heads.

The various cams are connected to the shaft 157 to rotate with it and this shaft receives rotative movement from the principal drive shaft 52. This is accomplished by providing a gear 191 to mesh with the gear 52 on the shaft 53 at the exit end of the machine. Gear 191 is on a stub shaft 192, which shaft is journaled in the main frame and carries a bevel gear 193. Bevel gear 193 meshes with another bevel gear 194, fixed to the end of a vertical shaft 195 and journaled in bearings 196 fastened to the end of the main frame and the standard 8. At the top of shaft 195 there is a bevel gear 197 in mesh with a bevel gear 198 on the end of cam shaft 157. The gearing is chosen so that a one-to-one ratio will be maintained, and shaft 157 will make one complete revolution for each revolution of the principal drive shaft 52 and, therefore, for each indexing step of the indexing dial 58 and for each step of movement of the feed chain 16.

After a tray has received its third layer of candies at the third candy loading station, it will be moved by the chain to the ejector station 13. At the ejector station, the rails 23 are cut away so that the tray is resting on the stringers 19 and is unconfined laterally. An ejector plate 199 is mounted to have an inoperative position at the inside of the tray path at this point, so that by outward movement of the tray path a filled candy tray at that point will be pushed from the chain. The ejector plate is mounted on the end of a link 200, which is connected in turn at spaced points to the lower end of a bell crank lever 201 and a second lever 202. The bell crank is pivoted at 203 to the standard 8, and its depending arm 204 and the lever 202 will be of the same length so that the link 200 and the ejector plate will have a substantially horizontal path of movement. The lever 202 is pivoted at 205, and another link 206 interconnects the pivotal points 203 and 205. The bell crank has an operating arm 207, which carries a roller 208 to ride in a groove 209 in a cam 210 carried on the vertical shaft 195. The throw of the cam is such that the ejector plate will be moved outwardly and back once each indexing movement of the feed chain, so that as each box reaches the ejector station it will be pushed from the chain. The boxes may be pushed onto a table or conveyor as desired.

This completes the description of the structure with the exception of the electrical circuits which control the several air and vacuum valves.

Valve 94, which controls the vacuum to the cup placement arms 70 on the transfer head 60, is controlled by a micro switch 211 which is actuated by a cam 212 connected to cam 159 on the cam shaft 157. Valve 141 is controlled by micro switch 213, operated by cam 214 carried by the cam 160. Valve 94 has its solenoid 215 connected to its micro switch 211 by wire 216. The micro switch is connected by wire 217 to one side of a power line 218. The other side of the solenoid is connected by wire 219 to the opposite side of the return line 220. Valve 121, in similar fashion, has its solenoid 221 connected to its micro switch 213 by wire 222, and the micro switch is connected to power line 218 by wire 223. The opposite side of the solenoid is connected by line 224 to the return line 220. Valve 188, which controls the suction to the candy pick up heads, has its micro switch 189 connected to the valve solenoid 225 by wire 226. The other side of the switch is connected by line 227 to the main line 218, and the other side of the solenoid is connected by wire 228 to the return line 220.

Figure 33 of the drawings shows the lay-out of all of the cams of the machine and their relation to one another during one complete cycle of operation of the machine. These relationships will be evident from the diagrammatic showing on Figure 33, but they will be referred to in connection with a complete restatement of the operation of the machine.

When the machine is to be operated, candy trays are supplied to the feed chain 16 in any conventional manner, and the two individual chains making up the feed chain will be adjusted by relative rotation of the driving sprockets 24 so that adjacent lugs on the chains will be positioned apart longitudinally of the chain path a distance equal to the candy tray length. Thus, when a tray comes onto the chain it will have its front end against a lug 22 and a second lug 22 on the other chain will come up behind it to push it along the chain path. During the entire movement of the tray along the chain path it will be held against longitudinal movement and precisely positioned at the several stations. The guide rails 23 will hold the tray against lateral movement during its passage through the machine.

When the tray arrives at the cup receiving station 9 it will receive a full row of glassine cups which have been held in assembly bar 59 positoned by the indexing dial 58 directly above the chain path and the box on the chain. The glassine cups have been assembled in the assembly bar during one full rotation of the indexing dial 58, which carries the assembly bar under the three accumulating positions represented by the legs and bridge member of the U-shaped transfer head. At the first one of these positions, the two cup placement arms 70 which are carried by that particular section of the transfer mechanism on the shaft 82 will have been rotated to their upper positions and the transfer head moved upwardly, so that the arms are within the magazines 61 above that portion of the transfer head and the heads 91 of these arms are within the bottom cups of the stacks in the magazines. At that time, cam 214 will actuate the micro switch 213 so that the valve 141 will open to admit air to the conduit 140 to depress pistons 135 and move the cup holding arms inwardly to press the sides of the bottom cup against the placement arm head. When this is done, cam 212 will actuate micro switch 211, and valve 94 will admit vacuum to the cup placement arms 70 so that the bottom cups of the stacks will be gripped. Cam 214 then again actuates micro switch 213, and valve 141 operates to cut off the air flow to the conduit 140 and to release the air in the conduit to atmosphere. This will allow the fingers 123 of the cup holding arms 119 to move back to their initial positions and the transfer head can move downwardly taking the bottom cups with it. At a midposition, as will be seen from Figure 33, the transfer head operating cam 76 will cause the transfer head to dwell, and cam 104 will come into play to rotate the shaft 82 through 180° to move the cup placement arms to their lower position. Cam 76 will then become operative to continue the downward movement of the transfer head, so that the cups will be placed within the openings in the assembly bar 59. The indexing dial 58 will then move one step and the operation will be repeated to bring two more cups into the assembly bar. At the next indexing step only one cup will be placed in the assembly bar, if a five cup arrangement is desired. In this event one of the coupling members 88 on the shaft 83 will have its opening plugged. It is to be noted from Figure 7 that the various cup placement arms 70 occupy different positions on the different shafts so that they will be in registry with predetermined openings in the assembly bar. The magazines 61, of course, will be positioned directly above the cup placement arms. The coupling member 88 which is plugged will occupy a position which would supply an end cup if a six-cup row is used, and it is to be noted from Figure 7 that the assembly bar is off-center to one side so that if a six-cup row is desired another assembly bar having an additional opening may be substituted. Five of the openings of the six-cup row would be identically positioned to the assembly head now shown, and the substitute bar would have the sixth opening to the right of the bar as viewed in Figure 7. After the assembly bar has received its full complement of cups, it is moved over the tray path as described, and on the next downward movement of the transfer head the ejector plungers 146 will operate to press the cups from the assembly bar into the tray positioned beneath it.

The feed chain will now move forward one step and a tray will be advanced to the first candy loading station. The vibrating table 150 will keep a constant supply of candies in the troughs 153 against the ledge 154. The several cams 158, 159, 160 and 161 will operate in the sequence shown on Figure 33 to cause the candy pick up heads 177 to move down over the candies in each of the troughs adjacent the ledge 154. When in this position, cam 190 will operate micro switch 199 to cause valve 188 to open the candy pick up heads 177 to vacuum. This will cause the candies to be tightly held by the pick up heads, and the transfer carriage 162 can then oscillate to lift the heads with the attached candies and then move forward over the tray path. The carriage will again oscillate to lower the heads into cups within the tray, and cam 190 will again cause actuation of valve 188 to release the vacuum. The heads will then rise and move back to the candy tray to repeat the operation upon the arrival of the next tray at that candy station.

The feed chain continues its step-by-step movement, carrying the trays to the other candy loading stations in sequence. At each of these a row of candies is placed upon the preceding one in the same manner as described for the candy loading station 10.

The next movement of the chain carries the tray to the ejector station where cam 210 becomes operative to cause the ejector plate 199 to move outwardly transversely of the chain path and push the tray at the ejector station from the chain. This completes the packing operation.

The manner in which the cup accumulating and assembling mechanism could be changed to enable packing a six-cup row was described. If a six-cup row is to be used, the tray will, of course, be longer. This will necessitate adjustment of the driving sprockets 24 to increase the distance between the chain lugs 22 to accommodate the longer box. In this adjustment the position of the chain carrying the pushing lugs will not be changed as these lugs determine the position of the trays with respect to the various stations. At the same time substitute candy tables 150 at each of the candy loading stations will have to be installed to provide the necessary six lanes of candy leading to the ledge. It is to be noted that the five row table is offset to one side and to the same side as the assembly bars 58 previously mentioned. The substitute tables, of course, will have the extra lane replacing the offset of those shown. It will also be necessary to use six cup ejector plungers 146 and to replace the candy pick up heads to supply six of these at each station also. These are the only changes that need be made to change the machine. It will, of course, be evident that the last candy loading station or the last two candy loading stations can be put out of operation at any time and the machine will continue to operate as before.

While in the above one practical embodiment of the invention has been disclosed, it will be understood that the specific details of structure described and shown are merely by way of illustration and the invention may take other forms within the scope of the appended claims.

What is claimed is:

1. A packing machine comprising, a frame, means on the frame defining a tray path, a receptacle accumulating and assembly station adjacent the path, an article loading station adjacent the path, means for advancing trays along the path to bring the trays to the receptacle accumulating and assembly and article loading stations, a plurality of sources of supply of receptacles, means at the receptacle accumulating and assembling station movable successively to each of the sources of receptacle supply and to the tray path to receive receptacles successively from the sources of supply in desired numbers and assemble the receptacles in predetermined order and deliver them to trays on the tray path, a source of supply of articles, and means at the article loading station to transfer articles from the source of article supply to receptacles in trays on the tray path.

2. In a packing machine as claimed in claim 1, means at the article loading station to arrange articles in predetermined order for transfer.

3. In a packing machine as claimed in claim 1, means adjacent the tray path to eject filled trays from the machine.

4. In a packing machine as claimed in claim 1, a second article loading station adjacent the tray path, a second source of article supply, and means to transfer articles from the second source of article supply to receptacles in trays on the tray path.

5. In a packing machine as claimed in claim 4, means at each of the article loading stations to arrange articles in predetermined order for transfer.

6. In a packing machine as claimed in claim 5, means adjacent the tray path for ejecting filled trays from the machine.

7. A packing machine comprising, a frame, means on the frame defining a tray path, a receptacle accumulating and assembly station adjacent the path, an article loading station adjacent the path, means for advancing trays along the path to bring the trays to the receptacle accumulating and assembly and article loading stations, a plurality of receptacle magazines at the accumulating and assembly station, assembly means for receiving a plurality of receptacles in predetermined pattern, means to move the assembly means beneath the magazines and over the tray path, means to withdraw receptacles from the magazines and deposit them on the assembly means, each magazine occupying a different position relative to the assembly means when the assembly means is beneath it, means to eject receptacles from the assembly means into trays on the path, a source of supply of articles, and means at the loading station to transfer articles from the source of supply to receptacles in trays on the tray path.

8. In a packing machine as claimed in claim 7, the means to withdraw receptacles from the magazines including a vacuum head, means to rotate the head to vertically upward and vertically downward positions, means to raise the vacuum head into a magazine when the head is vertically upward and lower it to the assembly means when the head is vertically downward, a source of vacuum connected to the head, and means to control the vacuum to the head.

9. In a packing machine as claimed in claim 8, means at the article loading station to arrange articles in the order of the receptacles on the assembly means for transfer by the article transfer means.

10. In a packing machine as claimed in claim 7, means at the article loading station to arrange articles in the order of the receptacles on the assembly means for transfer by the article transfer means.

11. A packing machine comprising, a frame, means on the frame defining a tray path, a receptacle accumulating and assembly station adjacent the path, an article loading station adjacent the path, means for advancing trays along the path to bring the trays to the receptacle accumulating and assembly and article loading stations, a plurality of sources of supply of receptacles, means at the accumulating and assembly station to take receptacles successively from the source of supply in desired numbers and assemble the receptacles in predetermined order and deliver the assembled receptacles to trays on the tray path, an inclined vibrating table at the article loading station down which articles may move, means on the table to cause the articles to move in defined paths to assume a predetermined arrangement, and means to pick up articles positioned on the table in the predetermined arrangement and transfer the articles to receptacles in trays on the tray path.

12. In a packing machine as claimed in claim 11, the means to pick up and transfer the articles including vacuum pick up arms, means to move said pick up arms to the vibrating table and the tray path, a source of vacuum connected to the pick up arms, and means to control the vacuum to the pick up arms.

13. In a packing machine as claimed in claim 12, means to maintain the pick up arms vertically disposed during the transfer movement.

14. A packing machine comprising, a frame, means on the frame defining a tray path, a receptacle accumulating and assembly station adjacent the path, an article loading station adjacent the path, means for advancing trays along the path to bring the trays to the receptacle accumulating and assembly and article loading stations, a plurality of receptacle magazines at the accumulating and assembly station, an assembly bar having a plurality of receptacle receiving openings arranged in a row therein, means to move the assembly bar step by step beneath the magazines and over the tray path, each magazine occupying a position over a different one of the openings in the assembly bar when the assembly bar is beneath it, means to remove receptacles from the magazines and place them in the openings in the assembly bar, means to eject receptacles from the openings in the assembly bar into trays on the tray path when the assembly bar is over the tray path, a source of supply of articles, and means at the loading station to transfer articles in rows from the source of supply to the rows of receptacles in the trays on the tray path.

15. In a packing machine as claimed in claim 14, the means to withdraw receptacles from the magazines including a vacuum head, means to rotate the head to vertically upward and vertically downward positions, means to raise the vacuum head into a magazine when the head is vertically upward and lower it to the assembly means when the head is vertically downward, a source of vacuum connected to the head, and means to control the vacuum to the head.

16. A packing machine comprising, a frame, means on the frame defining a tray path, a receptacle accumulating and assembly station adjacent the path, an article loading station adjacent the path, means for advancing trays along the path to bring the trays to the receptacle accumulating and assembly and article loading stations, a plurality of receptacle magazines at the accumulating and assembly station, an assembly bar having a plurality of openings in a row therein, means to move the assembly bar step by step beneath the magazines and over the tray path, each magazine occupying a position over a different one of the openings in the assembly bar when the assembly bar is beneath it, means to remove receptacles from the magazines and place them in the openings in the assembly bar, means to eject receptacles from the openings in the assembly bar into trays on the tray path when the assembly bar is over the tray path, an inclined vibrating table at the article loading station down which articles may move, means on the table to cause the articles to move in parallel paths, a ledge on the table to arrest the movement of articles and to hold them in transverse rows on the table, and means to pick up the transverse rows of articles on the table and transfer them to rows of receptacles in trays on the tray path.

17. In a packing machine as claimed in claim 16, the means to withdraw receptacles from the magazines including a vacuum head, means to rotate the head to vertically upward and vertically downward positions, means to raise the vacuum head into a magazine when the head is vertically upward and lower it to the assembly means when the head is vertically downward, a source of vacuum connected to the head, and means to control the vacuum to the head.

18. In a packing machine as claimed in claim 16, the means to pick up and transfer the articles including vacuum pick up arms, means to move said pick up arms to the vibrating table and the tray path, a source of vacuum connected to the pick up arms, and means to control the vacuum to the pick up arms.

19. In a packing machine as claimed in claim 16, the means to withdraw receptacles from the magazines including a vacuum head, means to rotate the head to vertically upward and vertically downward positions, means to raise the vacuum head into a magazine when the head is vertically upward and lower it to the assembly means when the head is vertically downward, a source of vacuum connected to the head, means to control the vacuum to the head, the means to pick up and transfer the articles including vacuum pick up arms, means to move said pick up arms to the vibrating table and the tray path, a source of vacuum connected to the pick up arms, and means to control the vacuum to the pick up arms.

20. In a packing machine as claimed in claim 16, the means to advance trays comprising, a conveyor chain having lugs thereon to engage trays on the tray path and means to advance the chain step by step.

21. In a packing machine as claimed in claim 16, the means to advance trays comprising, a pair of chains in side by side relation and having lugs to engage trays on the tray path, means to advance the chains step by step, and means to adjust the chains longitudinally relative to one another to vary the longitudinal spacing between the lugs on the opposed chains.

22. In a packing machine as claimed in claim 16, means to eject filled trays from the machine.

23. In a packing machine as claimed in claim 16, a second article loading station adjacent the first having a vibrating table and article transfer means.

24. In a packing machine as claimed in claim 23, means to eject filled trays from the machine.

25. A feeder for receptacles having upstanding flaring deformable sides comprising, a magazine to receive a stack of receptacles in inverted position, means on the magazine to underlie the side edges of the bottom receptacle of the stack and support the stack, a vacuum head mounted below the magazine for rotative movement to vertically upward and vertically downward positions, means to rotate the vacuum head, means to raise the vacuum head when in vertically upward position into the magazine and within the bottom receptacle of the stack, a source of vacuum connected to the vacuum head, means to open the head to vacuum when the vacuum head is within the bottom receptacle to attach the side walls of the bottom receptacle to the vacuum head, means to move the stack supporting means toward the vacuum head to press the receptacle sides against the vacuum head, means to move the stack supporting means from beneath the edges of the bottom receptacle, and means to cut off the vacuum head from the vacuum source after the vacuum head is in vertically downward position.

26. A feeder for receptacles having upstanding flaring deformable sides comprising, a magazine to receive a stack of receptacles in inverted position, means on the magazine to underlie the side edges of the bottom receptacle of the stack and support the stack, a vacuum head mounted below the magazine for rotative movement to vertically upward and vertically downward positions, means to rotate the vacuum head, means to raise the vacuum head when in vertically upward position into the magazine and within the bottom receptacle of the stack, a source of vacuum connected to the vacuum head, means to open the head to vacuum when the vacuum head is within the bottom receptacle to attach the side walls of the bottom receptacle to the vacuum head, means to release the stack supporting means from the edges of the bottom receptacle, and means to cut off the vacuum head from the vacuum source after the vacuum head is in vertically downward position, the means to support the stack of receptacles and release the bottom receptacle comprising, a plurality of receptacle holding arms pivotally mounted in the magazine and having fingers to underlie the edges of the receptacles in the stack and shoulders to contact the outer sides of the receptacles in the stack, means to swing the receptacle holding arms toward the receptacle stack, whereby the shoulders will press the flaring receptacle sides toward and against the vacuum head in the stack to cause the sides of the bottom receptacle to become attached thereto by suction, and means to retract the receptacle holding arms to stack-supporting positions and leave the bottom receptacle attached to the vacuum head.

27. In a feeder for receptacles as claimed in claim 26, adjustable means for determining the retracted positions of the receptacle holding arms.

28. A feeder and assembly unit for receptacles having upstanding flaring deformable sides comprising, an assembly bar, means to move the assembly bar along a predetermined path, a plurality of magazines to receive each a stack of receptacles in inverted position arranged over and spaced along the assembly bar path of movement, means on each magazine to underlie the side edges of the bottom receptacle of the stack and support the stack, a vacuum head mounted below each magazine and above the assembly bar path for rotative movement to vertically upward and vertically downward positions, means to rotate the vacuum heads, means to raise the vacuum heads when in vertically upward position into the magazines above them and within the bottom receptacles of the stacks and to lower them to the assembly bar when in vertically downward position, a source of vacuum connected to the vacuum heads, means to open the heads to vacuum when the vacuum heads are within the bottom receptacles of the stacks to attach the side walls of the bottom receptacles to the vacuum heads, means to release the stack supporting means from the edges of the bottom receptacles and means to cut off the vacuum heads from the vacuum source after the vacuum heads have rotated to vertically downward position and lowered to the assembly bar to release the receptacles to the assembly bar.

29. In a feeder and assembly unit as claimed in claim 28, each of said magazines occupying a different position above the assembly bar at the time receptacles are released from the vacuum heads to the assembly bars.

30. In a feeder for receptacles as claimed in claim 29, the means to support the stacks of receptacles and release the bottom receptacle comprising, a plurality of receptacle holding arms pivotally mounted in each magazine and having fingers to underlie the edges of the receptacles in the stack and shoulders to contact the outer sides of the receptacles in the stack, means to swing the receptacle holding arms toward the receptacle stack, whereby the shoulders will press the flaring receptacle sides toward and against the vacuum head in the stack to cause the sides of the bottom receptacle to become attached thereto by suction, and means to retract the receptacle holding arms to stack-supporting position and leave the bottom receptacle attached to the vacuum head.

31. In a feeder and assembly unit as claimed in claim 28, means to eject receptacles assembled on the assembly bar.

32. A feeder and assembly unit for receptacles having upstanding flaring deformable sides comprising, a plurality of magazines each to receive a stack of receptacles in inverted position and having means to underlie the side edges of the bottom receptacle of the stack to support the stack vertically within the magazine, the plurality of magazines being arranged in U-formation with magazines along the legs and across the bridge of the U, a transfer head of U-shape underlying the magazines, a horizontal dial rotatably mounted beneath the transfer head, a plurality of transfer bars carried by the dial equispaced therearound the positioned longitudinally one beneath each leg of the U-formation of the magazines, one beneath the bridge of the formation and one at the open end of the U, means to rotatively index the dial to bring the assembly bars successively beneath the magazines on the legs, bridge and open end of the U formation, the U-shaped transfer head having shafting extending along the legs and bridge of the U-shape and interconnected for simultaneous rotative movement, a plurality of receptacle placement arms mounted on the shafting, each arm being beneath one of the magazines, means to rotate the shafting to bring the receptacle placement arms to vertically upward and vertically downward positions, means to raise and lower the transfer head to lift the receptacle placement arms when in vertically upward position into the magazines and into the bottom receptacles of the stacks and to lower the transfer heads toward the assembly bars when the receptacle placement arms are in vertically downward position, means to connect the receptacle placement arms to a source of vacuum, and means to control the vacuum to the receptacle placement arms.

33. In a feeder assembly unit as claimed in claim 32, means above the assembly bar position at the open end of the U-formation to eject receptacles from the assembly bar.

34. In a feeder and assembly unit as claimed in claim 32, each of the magazines occupying a different position relative to the assembly bar beneath it.

35. In a feeder and assembly unit as claimed in claim 32, a plurality of receptacle holding arms pivotally mounted in each magazine having fingers to underlie the edges of the bottom receptacles in the stack to support the stack and shoulders to contact the outer surfaces of the sides of the receptacles in the stack, means to swing the receptacle holding arms toward the receptacle stack to press the sides of the receptacles toward and the sides of the bottom receptacle into contact with the receptacle placement arm within the stack, and means to retract the receptacle holding arms.

36. In a feeder and assembly unit as claimed in claim 35, adjustable means for determining the retracted positions of the receptacle holding arms.

37. An article arranging and loading unit comprising, an inclined table having a raised ledge projecting above the lower edge of the top surface, means on the table to arrange articles moving thereacross into predetermined order adjacent the ledge, means to vibrate the table to cause articles placed thereon to gravitate toward the ledge, and means to lift articles in the predetermined order from the table adjacent the ledge and transfer them from the table and deposit them at a desired location, the means to lift and transfer articles from the table comprising, a transfer carriage, horizontal guides for the transfer carriage, means to move the transfer carriage in reverse directions in the guides to positions over the table adjacent the ledge and over an area for the deposit of articles, arms pivotally mounted on the transfer carriage for vertical movement, means to swing the arms vertically, a plurality of pick up heads arranged and joined in said predetermined order and carried by the arms, means to connect the pick up arms to a source of vacuum, and means to control the vacuum to the pick up heads.

38. In an article arranging and loading unit as claimed in claim 37, means to maintain the pick up heads in vertical position.

39. In an article arranging and loading unit as claimed in claim 38, the means to arrange articles on the table including partitions positioned longitudinally of the table in the direction of article travel across the table to cause the articles to move in rows toward the ledge.

40. An article arranging and loading unit comprising, an inclined table having a ledge projecting above the lower edge of the top surface, means on the table to arrange articles moving thereacross into predetermined order adjacent the ledge, means to vibrate the table to cause articles placed thereon to gravitate toward the ledge, a transfer carriage, horizontal guides for the transfer carriage, means to move the transfer carriage in reverse directions in the guides to positions over the table adjacent the ledge and over an area for the deposit of articles, arms pivotally mounted on the transfer carriage for vertical swinging movement, means to swing the arms vertically, a plurality of pick-up heads arranged and joined in said predetermined order and pivotally connected to the arms, means interconnecting the joined pick-up heads and arms to control the angle of the pick-up heads relative to the transfer carriage, means to connect the pick-up arms to a source of vacuum, and means to control the vacuum to the pick-up heads.

References Cited in the file of this patent

UNITED STATES PATENTS

| | | |
|---|---|---|
| 1,945,846 | Adams | Feb. 6, 1934 |
| 1,959,327 | Adams | May 22, 1934 |
| 2,524,846 | Socke et al. | Oct. 10, 1950 |
| 2,544,125 | Bain et al. | Mar. 6, 1951 |
| 2,796,711 | Rich | June 25, 1957 |
| 2,886,927 | Fisk | May 19, 1959 |